US011815223B2

United States Patent
Malott et al.

(10) Patent No.: US 11,815,223 B2
(45) Date of Patent: Nov. 14, 2023

(54) WALL ANCHORS AND RELATED WALL MOUNT SYSTEMS

(71) Applicant: THE HILLMAN GROUP, INC., Cincinnati, OH (US)

(72) Inventors: Dale G. Malott, Chandler, AZ (US); Byron K. Grice, Phoenix, AZ (US); Gary E. Will, Gold Canyon, AZ (US); Benjamin M. Sandoval, Payson, AZ (US); Jerry D. Stoneking, Phoenix, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 177 days.

(21) Appl. No.: 17/031,022

(22) Filed: Sep. 24, 2020

(65) Prior Publication Data
US 2021/0007484 A1   Jan. 14, 2021

Related U.S. Application Data

(62) Division of application No. 15/331,015, filed on Oct. 21, 2016, now Pat. No. 10,799,025.

(Continued)

(51) Int. Cl.
*F16M 13/02* (2006.01)
*A47B 96/06* (2006.01)
(Continued)

(52) U.S. Cl.
CPC ............. *F16M 13/02* (2013.01); *A47B 96/06* (2013.01); *A47G 1/22* (2013.01); *F16B 15/00* (2013.01);
(Continued)

(58) Field of Classification Search
CPC ........ A47G 1/20; A47G 1/205; A47G 1/1633; A47G 1/1606; A47G 1/22; A47G 1/16;
(Continued)

(56) References Cited

U.S. PATENT DOCUMENTS

| | | |
|---|---|---|
| 113,862 A | 4/1871 | Duffett |
| 165,206 A | 7/1875 | Brown |

(Continued)

FOREIGN PATENT DOCUMENTS

| | | | |
|---|---|---|---|
| CA | 2418618 A1 * | 9/2003 | ............... A47G 1/20 |
| CH | 197823 A * | 5/1938 | ............... A47G 1/20 |

(Continued)

OTHER PUBLICATIONS

PCT, International Search Report and Written Opinion, International Application No. PCT/US2016/057606; dated May 3, 2018, 15 pages.

(Continued)

*Primary Examiner* — Taylor Morris
(74) *Attorney, Agent, or Firm* — Thompson Hine LLP

(57) ABSTRACT

An anchor assembly for anchoring an object on a wall includes a first anchor component and second anchor component, each anchor component pivotable relative to the assembly and having a back side and a front side, and each anchor component having at least one curved wall penetrating retainer extending therefrom. The anchor assembly has an install orientation in the wall in which the wall penetrating retainer of each anchor component is inserted within the wall for a jaw-type grip of the wall.

3 Claims, 46 Drawing Sheets

Related U.S. Application Data

(60) Provisional application No. 62/245,442, filed on Oct. 23, 2015.

(51) Int. Cl.
   *A47G 1/22*   (2006.01)
   *F16B 15/00*  (2006.01)
   *A47G 1/20*   (2006.01)
   *F16B 2/10*   (2006.01)

(52) U.S. Cl.
   CPC ............... *A47G 1/20* (2013.01); *A47G 1/205* (2013.01); *F16B 2/10* (2013.01); *F16B 15/0053* (2013.01)

(58) Field of Classification Search
   CPC ... A47G 2001/207; F16B 45/00; F16B 15/00; F16B 15/0038; F16B 15/02; F16B 2/10; F16B 15/0053; F16M 13/02; A47B 96/06
   USPC .......................................... 248/216.1, 217.3
   See application file for complete search history.

(56) References Cited

U.S. PATENT DOCUMENTS

| | | | |
|---|---|---|---|
| 251,616 A | 12/1881 | McGill | |
| 297,173 A | 4/1884 | Seliger | |
| 371,205 A | 10/1887 | McConnoughay | |
| 423,730 A | 3/1890 | Charlton | |
| 444,933 A | 1/1891 | Barnes | |
| 489,593 A | 1/1893 | Ramer | |
| 763,448 A | 6/1904 | Winter | |
| 769,794 A | 9/1904 | Fowler | |
| 777,879 A | 12/1904 | Blum | |
| 795,704 A | 7/1905 | Jones | |
| 874,412 A | 12/1907 | Lewis | |
| 938,998 A | 11/1909 | Evans | |
| 965,151 A | 7/1910 | Benjamin | |
| 992,203 A | 5/1911 | Johnson | |
| 998,015 A | 7/1911 | Kopsa | |
| 1,002,910 A | 9/1911 | Foote | |
| 1,270,718 A | 6/1918 | Ford | |
| 1,306,114 A | 6/1919 | Koval | |
| 1,343,855 A | 6/1920 | Tyler | |
| 1,425,873 A | 8/1922 | Lineaweaver | |
| 1,651,392 A | 12/1927 | Honigbaum | |
| 1,802,934 A | 4/1931 | Balch | |
| 1,883,834 A | 10/1932 | Turner | |
| 1,958,497 A | 5/1934 | Rivers | |
| 2,062,887 A | 12/1936 | Karst | |
| 2,119,931 A | 6/1938 | Smith | |
| 2,197,750 A * | 4/1940 | Lagaard | E04F 13/0835 52/363 |
| 2,295,370 A | 9/1942 | Tritt | |
| 2,317,368 A | 4/1943 | Frey | |
| 2,334,700 A | 11/1943 | Frey | |
| 2,448,137 A * | 8/1948 | Cody | A47G 1/22 248/497 |
| 2,468,190 A * | 4/1949 | Friedheim | B25H 3/04 248/300 |
| 2,505,324 A | 4/1950 | Cornelius | |
| 2,539,825 A | 1/1951 | Genua | |
| 2,577,011 A | 12/1951 | Hallenscheid | |
| 2,751,807 A | 6/1956 | Harre | |
| 2,980,309 A | 4/1961 | Papas Louis | |
| 3,001,752 A | 9/1961 | Loy | |
| 3,004,815 A | 10/1961 | O'Kain | |
| 3,020,602 A | 2/1962 | Siering | |
| 3,029,056 A | 4/1962 | Breglia | |
| 3,174,592 A | 3/1965 | Berman | |
| 3,226,065 A | 12/1965 | Smith | |
| 3,298,651 A | 1/1967 | Passer | |
| 3,319,917 A | 5/1967 | Bilodeau | |
| 3,425,568 A | 2/1969 | Albright | |
| 3,433,449 A | 3/1969 | Musante | |
| 3,482,706 A | 12/1969 | Stewart | |
| 3,503,147 A | 3/1970 | Herrin | |
| 3,524,584 A | 8/1970 | Ihlenfeld | |
| 3,589,758 A | 6/1971 | King | |
| 3,601,428 A | 8/1971 | Gilb | |
| 3,620,404 A | 11/1971 | Grasso | |
| 3,640,497 A | 2/1972 | Waki | |
| 3,666,936 A | 5/1972 | Webster | |
| 3,685,778 A | 8/1972 | Berns | |
| 3,754,805 A | 8/1973 | Pangburn | |
| 3,775,884 A | 12/1973 | Smith | |
| 3,799,072 A | 3/1974 | Slaboden | |
| 3,813,800 A | 6/1974 | Turner | |
| 3,859,002 A | 1/1975 | Sauey | |
| 3,861,631 A | 1/1975 | Shorin | |
| 3,891,172 A | 6/1975 | Einhorn | |
| 3,912,211 A | 10/1975 | Topf | |
| 3,923,278 A * | 12/1975 | Marcil | A47G 1/20 248/304 |
| 3,926,394 A | 12/1975 | Mauceri et al. | |
| 3,929,194 A | 12/1975 | Warfel | |
| 3,966,157 A | 6/1976 | Corral et al. | |
| 3,995,822 A | 12/1976 | Einhorn et al. | |
| 4,017,048 A | 4/1977 | Einhorn | |
| 4,039,138 A | 8/1977 | Einhorn | |
| 4,040,149 A | 8/1977 | Einhorn | |
| 4,082,243 A | 4/1978 | Watt | |
| 4,083,314 A | 4/1978 | Garvin | |
| 4,113,109 A * | 9/1978 | Donnelli | B65D 77/22 211/49.1 |
| 4,124,189 A | 11/1978 | Einhorn | |
| 4,134,625 A | 1/1979 | Palka | |
| D255,301 S | 6/1980 | Windisch | |
| 4,208,012 A | 6/1980 | Dutcher | |
| 4,221,442 A | 9/1980 | Harangozo | |
| D257,219 S | 10/1980 | Cook | |
| 4,228,982 A | 10/1980 | Sellera | |
| 4,237,630 A | 12/1980 | Franzone | |
| 4,262,605 A | 4/1981 | Sokol | |
| 4,270,821 A | 6/1981 | Verdesca | |
| 4,293,173 A | 10/1981 | Tricca | |
| 4,294,778 A | 10/1981 | DeLuca | |
| 4,300,745 A | 11/1981 | Peterson | |
| 4,304,447 A | 12/1981 | Ellwood | |
| 4,317,603 A | 3/1982 | Pepicelli | |
| 4,333,625 A | 6/1982 | Haug | |
| 4,340,144 A | 7/1982 | Cousins | |
| 4,372,450 A | 2/1983 | Licari | |
| 4,422,608 A | 12/1983 | Hogg | |
| 4,452,500 A | 6/1984 | Zlotnik | |
| 4,458,387 A | 7/1984 | Pearson | |
| 4,485,995 A | 12/1984 | Hogg | |
| 4,505,226 A | 3/1985 | Carlson | |
| 4,506,856 A | 3/1985 | Rich | |
| 4,509,713 A | 4/1985 | Hogg | |
| 4,571,866 A * | 2/1986 | Cole | A47G 1/162 248/496 |
| 4,572,380 A * | 2/1986 | Langwell | A47F 5/0068 402/19 |
| 4,583,647 A | 4/1986 | Schinzing | |
| D285,743 S | 9/1986 | Richwine | |
| 4,613,108 A | 9/1986 | Sundstrom et al. | |
| D286,118 S | 10/1986 | Gecchelin | |
| 4,619,430 A | 10/1986 | Hogg | |
| 4,621,473 A | 11/1986 | Wendt | |
| 4,655,423 A | 4/1987 | Schavilje et al. | |
| 4,681,380 A | 7/1987 | Carlin | |
| 4,719,917 A | 1/1988 | Barrows et al. | |
| 4,775,129 A | 10/1988 | Gleisten | |
| 4,804,161 A * | 2/1989 | Wallo | A47G 1/164 40/757 |
| 4,831,754 A | 5/1989 | Tallent | |
| 4,910,934 A | 3/1990 | Hennings | |
| 4,932,519 A | 6/1990 | Trauschke | |
| 4,976,057 A | 12/1990 | Bianchi | |
| 4,998,361 A | 3/1991 | Gordon | |
| 5,069,412 A | 12/1991 | Jacob | |
| 5,103,573 A | 4/1992 | Ehling | |
| 5,107,601 A | 4/1992 | Semchuck | |

(56) References Cited

U.S. PATENT DOCUMENTS

| | | |
|---|---|---|
| 5,110,080 A | 5/1992 | Rieman |
| 5,135,194 A | 8/1992 | Laughon |
| 5,138,134 A | 8/1992 | Ellison |
| 5,149,037 A | 9/1992 | Smith |
| 5,241,715 A | 9/1993 | Duvall |
| 5,265,357 A | 11/1993 | Yu |
| 5,267,715 A | 12/1993 | Owen |
| 5,267,718 A * | 12/1993 | Sheehan .............. A47G 1/22 248/301 |
| 5,267,719 A | 12/1993 | Keller |
| 5,325,815 A | 7/1994 | Gumpesberger |
| 5,332,108 A | 7/1994 | Blass |
| 5,351,842 A | 10/1994 | Remmers |
| 5,372,346 A | 12/1994 | Upchurch |
| 5,401,094 A | 3/1995 | Walsten |
| 5,407,160 A | 4/1995 | Hollingsworth |
| 5,433,416 A | 7/1995 | Johnson |
| 5,454,542 A | 10/1995 | Hart |
| 5,477,010 A | 12/1995 | Buckshaw |
| 5,484,126 A | 1/1996 | Kitchin |
| 5,495,954 A | 3/1996 | Schmidt |
| 5,507,248 A | 4/1996 | Gabbed |
| 5,517,947 A | 5/1996 | Christman |
| 5,570,938 A | 11/1996 | Butler |
| 5,586,934 A | 12/1996 | Dombrowski |
| 5,588,629 A | 12/1996 | Barnes |
| 5,605,313 A | 2/1997 | Erickson |
| 5,613,660 A | 3/1997 | Wyatt |
| 5,638,644 A | 6/1997 | Bastian |
| 5,641,079 A | 6/1997 | Schmidt |
| 5,727,698 A | 3/1998 | Lai |
| 5,743,038 A | 4/1998 | Soto |
| 5,806,223 A | 9/1998 | Visagie |
| D399,692 S | 10/1998 | Wilcox |
| 5,819,958 A | 10/1998 | Dement |
| 5,839,649 A | 11/1998 | Clark |
| 5,878,988 A | 3/1999 | Rakower |
| 5,906,032 A | 5/1999 | Fredriksson |
| 6,009,681 A | 1/2000 | Kozloff |
| 6,042,243 A | 3/2000 | Grill |
| 6,045,374 A | 4/2000 | Candeloro |
| 6,051,788 A | 4/2000 | Nichols |
| 6,109,461 A | 5/2000 | Kluge |
| 6,082,560 A | 7/2000 | Timm |
| 6,101,780 A | 8/2000 | Kreidt |
| 6,126,126 A | 10/2000 | McKiernan, Jr. |
| 6,135,409 A | 10/2000 | O'Keeffe |
| D434,303 S | 11/2000 | DeCosta |
| 6,158,828 A | 12/2000 | Vacovsky |
| D436,841 S | 1/2001 | Carpenter |
| 6,173,848 B1 | 1/2001 | Bravo |
| 6,179,136 B1 | 1/2001 | Kluge |
| 6,196,141 B1 | 3/2001 | Herron, III |
| 6,202,838 B1 | 3/2001 | Tran |
| 6,260,489 B1 | 7/2001 | Weaver |
| 6,279,862 B1 | 8/2001 | Gershowitz |
| 6,286,690 B1 | 9/2001 | Thalenfeld |
| 6,286,802 B1 | 9/2001 | Munson |
| 6,299,001 B1 | 10/2001 | Frolov |
| 6,325,345 B1 | 12/2001 | Carpenter |
| 6,351,905 B1 | 3/2002 | Dean |
| 6,357,608 B1 | 3/2002 | Timm |
| 6,364,260 B1 | 4/2002 | Lorincz |
| 6,371,427 B1 | 4/2002 | Johnson |
| 6,431,510 B1 | 8/2002 | Puritz |
| 6,439,520 B1 | 8/2002 | Johnson |
| D465,348 S | 11/2002 | Lucatello |
| 6,478,273 B1 | 11/2002 | McKiernan, Jr. |
| 6,520,355 B1 | 2/2003 | Pritchard |
| 6,572,063 B1 | 6/2003 | Gitelman |
| 6,585,205 B2 | 7/2003 | Beaty |
| 6,629,680 B2 | 10/2003 | Weck |
| 6,641,107 B1 | 11/2003 | Janssen |
| 6,641,344 B2 | 11/2003 | Weiss |
| 6,644,609 B1 | 11/2003 | Scott |
| 6,659,295 B1 | 12/2003 | DeLand |
| 6,663,201 B2 | 12/2003 | Herron, III |
| D486,057 S | 2/2004 | Chen |
| 6,726,034 B2 | 4/2004 | Holbrook |
| 6,758,454 B2 | 7/2004 | Smed |
| D494,452 S | 8/2004 | Sheldon et al. |
| 6,775,935 B1 | 8/2004 | Cohen |
| 6,830,228 B2 | 12/2004 | Ernst |
| 6,932,225 B2 | 8/2005 | Rowe |
| D511,088 S | 11/2005 | Chiu |
| D513,562 S | 1/2006 | Boffo |
| D515,911 S | 2/2006 | McDuff |
| 6,994,448 B1 | 2/2006 | Gorrell |
| D516,412 S | 3/2006 | McDuff |
| D517,344 S | 3/2006 | Zens |
| 7,086,543 B2 | 8/2006 | Remmers |
| 7,146,760 B2 | 12/2006 | Yiu |
| 7,178,305 B2 | 2/2007 | Petrova |
| 7,210,243 B2 | 5/2007 | Schmidt |
| 7,216,841 B2 | 5/2007 | Dodig, Jr. |
| 7,225,590 B1 | 6/2007 | diGirolamo |
| 7,225,935 B2 | 6/2007 | Breymaier |
| D554,483 S | 11/2007 | Hager et al. |
| 7,395,998 B2 | 7/2008 | Peterson |
| 7,398,013 B2 | 7/2008 | He |
| 7,431,258 B2 | 10/2008 | Lamotta |
| 7,478,785 B2 | 1/2009 | Herron, III |
| 7,497,028 B2 | 3/2009 | Nevers |
| 7,506,772 B2 | 3/2009 | Chen |
| D596,930 S | 7/2009 | Gaudron |
| 7,591,097 B2 | 9/2009 | Alman |
| D606,185 S | 12/2009 | Wefler |
| 7,669,723 B2 | 3/2010 | Kao |
| 7,694,401 B2 * | 4/2010 | Peterson .............. B25C 3/002 248/475.1 |
| 7,708,252 B2 | 5/2010 | Vander Berg et al. |
| 7,900,783 B2 | 3/2011 | Fernandez |
| D635,843 S | 4/2011 | McDuff |
| D636,256 S | 4/2011 | McDuff |
| 7,931,159 B2 | 4/2011 | Kao |
| 7,967,268 B2 | 6/2011 | Herron, III |
| RE42,649 E | 8/2011 | Schultz |
| D649,022 S | 11/2011 | McDuff |
| D649,023 S | 11/2011 | McDuff |
| D649,436 S | 11/2011 | McDuff |
| D649,437 S | 11/2011 | McDuff |
| D649,438 S | 11/2011 | McDuff |
| D649,439 S | 11/2011 | McDuff |
| D650,261 S | 12/2011 | McDuff |
| 8,074,603 B2 | 12/2011 | Ohlman |
| 8,087,521 B2 | 1/2012 | Schwartzkopf |
| 8,096,026 B2 | 1/2012 | Bevirt |
| 8,114,226 B2 | 2/2012 | Ernst et al. |
| 8,146,755 B2 | 4/2012 | Schwartzkopf |
| 8,177,079 B2 | 5/2012 | Schwartzkopf |
| 8,210,368 B2 | 7/2012 | Schwartzkopf |
| 8,256,628 B2 | 9/2012 | Stafford |
| 8,272,610 B2 | 9/2012 | Ernst et al. |
| 8,308,116 B2 | 11/2012 | Daniels |
| 8,317,148 B2 | 11/2012 | Ernst et al. |
| D672,224 S | 12/2012 | Brinson et al. |
| 8,333,356 B2 | 12/2012 | Ernst et al. |
| 8,398,048 B2 | 3/2013 | Popkin et al. |
| 8,414,239 B2 | 4/2013 | McDuff |
| 8,434,629 B2 | 5/2013 | Fernandez |
| 8,448,910 B2 | 5/2013 | Ernst et al. |
| 8,517,189 B2 | 8/2013 | Donohoe |
| RE44,504 E | 9/2013 | Schultz |
| 8,544,805 B2 | 10/2013 | Virgin |
| 8,633,404 B2 * | 1/2014 | Korcz ............... H02G 3/386 174/56 |
| 8,667,701 B1 | 3/2014 | Geesaman |
| 8,667,765 B1 | 3/2014 | McCarthy |
| 8,740,171 B2 | 6/2014 | Crescenzo |
| 8,757,570 B2 | 6/2014 | Ernst et al. |
| 8,813,404 B2 | 8/2014 | Goppion |
| 8,833,876 B2 | 9/2014 | Lee |
| 8,839,964 B2 | 9/2014 | Hawkins |
| 8,857,780 B1 | 10/2014 | Goss |

(56) References Cited

U.S. PATENT DOCUMENTS

| | | | |
|---|---|---|---|
| D717,114 S | 11/2014 | Katterheinrich | |
| 8,974,166 B2 | 3/2015 | McDuff | |
| 8,979,296 B2 | 3/2015 | Wiemer | |
| D731,716 S | 6/2015 | Kuiper | |
| 9,044,110 B2 | 6/2015 | McDuff et al. | |
| 9,151,585 B2 | 10/2015 | Sanchez | |
| D744,773 S | 12/2015 | Yoon | |
| 9,261,229 B2 | 2/2016 | Callif et al. | |
| 9,296,552 B2 | 3/2016 | Schleuning | |
| 9,307,837 B2 | 4/2016 | Wood | |
| 9,380,885 B1 | 7/2016 | Nguyen | |
| 9,429,178 B2 | 8/2016 | Hampel | |
| 9,496,695 B2 | 11/2016 | Battaglia | |
| 9,563,078 B2 | 2/2017 | Ryu | |
| 9,593,523 B1 | 3/2017 | Trimble | |
| D783,907 S | 4/2017 | Ohlman | |
| 9,668,596 B2 | 6/2017 | Crescenzo | |
| D794,424 S | 8/2017 | Thompson | |
| D797,464 S | 9/2017 | Vitale | |
| 9,775,450 B2 * | 10/2017 | Will | A47G 1/1633 |
| 9,826,828 B1 | 11/2017 | Vaughan | |
| D804,287 S | 12/2017 | Baldwin | |
| 10,539,266 B2 * | 1/2020 | Will | B43L 1/00 |
| 10,772,444 B2 * | 9/2020 | Stas | A47G 1/22 |
| 10,895,099 B2 * | 1/2021 | Vos | E06B 1/6015 |
| D942,844 S * | 2/2022 | Davenport | E04F 13/0835 |
| | | | D8/371 |
| 2002/0026736 A1 | 3/2002 | Spencer | |
| 2002/0078583 A1 | 6/2002 | Richardson | |
| 2002/0088912 A1 | 7/2002 | Yu | |
| 2002/0182910 A1 | 12/2002 | Kiughadush | |
| 2003/0052073 A1 | 3/2003 | Dix | |
| 2003/0071182 A1 | 4/2003 | Beaty et al. | |
| 2003/0080265 A1 | 5/2003 | Valiulis | |
| 2003/0161680 A1 | 8/2003 | Suckow | |
| 2003/0178545 A1 | 9/2003 | Ernst | |
| 2004/0231218 A1 | 11/2004 | Dominioni | |
| 2004/0261307 A1 | 12/2004 | Siegel | |
| 2005/0000854 A1 | 1/2005 | Madigan | |
| 2005/0017147 A1 | 1/2005 | Fuelling | |
| 2005/0279041 A1 | 12/2005 | Staples | |
| 2006/0134375 A1 | 6/2006 | Peterson | |
| 2006/0180557 A1 | 8/2006 | Weinstein | |
| 2006/0182517 A1 | 8/2006 | McDuff | |
| 2007/0006504 A1 | 1/2007 | Kao | |
| 2007/0023605 A1 | 2/2007 | Schlais | |
| 2007/0063119 A1 | 3/2007 | Hunag | |
| 2007/0084743 A1 | 4/2007 | Chu | |
| 2007/0124910 A1 | 6/2007 | Peterson et al. | |
| 2007/0145222 A1 | 6/2007 | Rausch | |
| 2007/0194202 A1 | 8/2007 | Lamotta | |
| 2007/0205344 A1 | 9/2007 | Liermann et al. | |
| 2007/0235622 A1 | 10/2007 | Baran et al. | |
| 2007/0256850 A1 | 11/2007 | Hanse | |
| 2007/0257168 A1 | 11/2007 | Friedrichs | |
| 2008/0053934 A1 | 3/2008 | Newbould | |
| 2008/0053935 A1 | 3/2008 | Newbouild | |
| 2008/0142660 A1 | 6/2008 | Goldberg | |
| 2008/0187688 A1 | 8/2008 | Gunther | |
| 2008/0251682 A1 | 10/2008 | Repac | |
| 2008/0283205 A1 | 11/2008 | Zimmer | |
| 2008/0296456 A1 | 12/2008 | Lien | |
| 2008/0302936 A1 | 12/2008 | Forbes | |
| 2009/0015121 A1 | 1/2009 | Sampson | |
| 2009/0145804 A1 | 6/2009 | Kabel | |
| 2009/0307953 A1 | 12/2009 | Ahlstrom | |
| 2010/0005756 A1 | 1/2010 | McDuff | |
| 2010/0084530 A1 | 4/2010 | Lai | |
| 2010/0178448 A1 | 7/2010 | Nakajima | |
| 2010/0193455 A1 | 8/2010 | Russell | |
| 2010/0213333 A1 | 8/2010 | Mejia et al. | |
| 2010/0219312 A1 | 9/2010 | Johnson et al. | |
| 2010/0300999 A1 | 12/2010 | Schwartzkopf | |
| 2010/0326019 A1 | 12/2010 | Lofgren | |
| 2011/0024585 A1 | 2/2011 | Brinkdopke | |
| 2011/0147236 A1 | 6/2011 | Johnson | |
| 2011/0188250 A1 | 8/2011 | Waldhuetter | |
| 2011/0294320 A1 | 12/2011 | Bennett | |
| 2012/0001039 A1 | 1/2012 | McDuff | |
| 2012/0001040 A1 | 1/2012 | McDuff | |
| 2012/0056051 A1 | 3/2012 | Gold | |
| 2012/0080343 A1 | 4/2012 | Gretz | |
| 2012/0146470 A1 | 6/2012 | Katz | |
| 2013/0105426 A1 | 5/2013 | Dyck | |
| 2013/0105653 A1 | 5/2013 | Borys | |
| 2014/0144055 A1 | 5/2014 | Byfield | |
| 2014/0212602 A1 | 7/2014 | Thornton | |
| 2014/0231604 A1 | 8/2014 | Long | |
| 2014/0248105 A1 | 9/2014 | Namekawa | |
| 2014/0259840 A1 | 9/2014 | Placko | |
| 2014/0263122 A1 | 9/2014 | Roberts | |
| 2014/0263924 A1 | 9/2014 | Crescenzo | |
| 2014/0346310 A1 | 11/2014 | Yang | |
| 2015/0016970 A1 | 1/2015 | Smith | |
| 2015/0060627 A1 | 3/2015 | Stauber | |
| 2015/0308613 A1 | 10/2015 | Callif | |
| 2016/0029814 A1 | 2/2016 | Brown | |
| 2017/0000270 A1 | 1/2017 | Will | |
| 2017/0002973 A1 | 1/2017 | Will | |
| 2017/0002974 A1 | 1/2017 | Will | |
| 2017/0112281 A1 | 4/2017 | Malott | |
| 2017/0112282 A1 | 4/2017 | Will | |
| 2017/0127867 A1 * | 5/2017 | Malott | A47G 25/0678 |
| 2017/0143121 A1 | 5/2017 | Grice | |
| 2017/0246546 A1 | 8/2017 | Brown | |
| 2017/0347812 A1 | 12/2017 | Will | |
| 2018/0100617 A1 | 4/2018 | Forrest | |
| 2021/0207645 A1 * | 7/2021 | Hoffman | F16B 45/00 |

FOREIGN PATENT DOCUMENTS

| | | | | |
|---|---|---|---|---|
| CH | | 491296 A * | 5/1970 | A47G 1/20 |
| CH | | 497882 A * | 10/1970 | A47G 1/20 |
| CN | | 1050759 | 4/1991 | |
| CN | | 1096558 | 12/1994 | |
| CN | | 2209493 | 10/1995 | |
| CN | | 1154159 | 7/1997 | |
| CN | | 2449598 Y | 9/2001 | |
| CN | | 201012022 | 1/2008 | |
| CN | | 201351654 | 11/2009 | |
| CN | | 201542372 U | 8/2010 | |
| CN | | 103702592 | 4/2014 | |
| GB | | 676903 | 8/1952 | |
| WO | WO 1999/052741 | | 10/1999 | |
| WO | WO 2007/095351 | | 8/2007 | |
| WO | WO 2015/150222 | | 10/2015 | |
| WO | WO-2021038389 A1 * | | 3/2021 | A47G 1/20 |

OTHER PUBLICATIONS

List of Patents or Patent Applications Treated as Related, submitted herewith.

U.S. Appl. No. 15/331,015 Prosecution History, 745 pages.

* cited by examiner

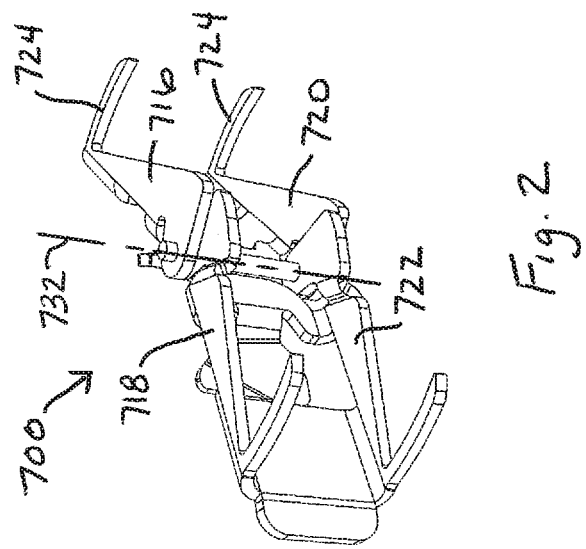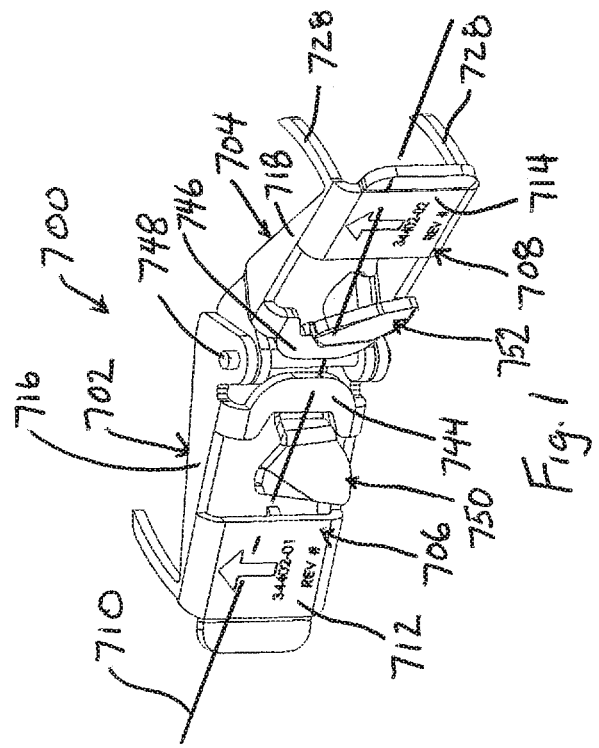

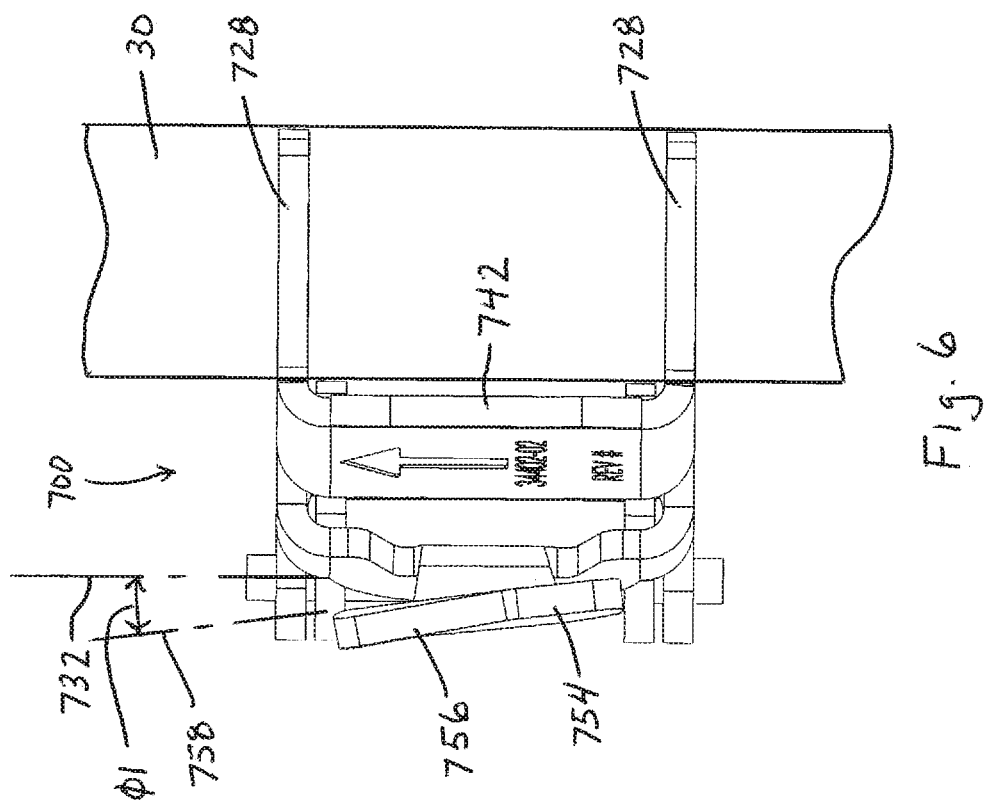

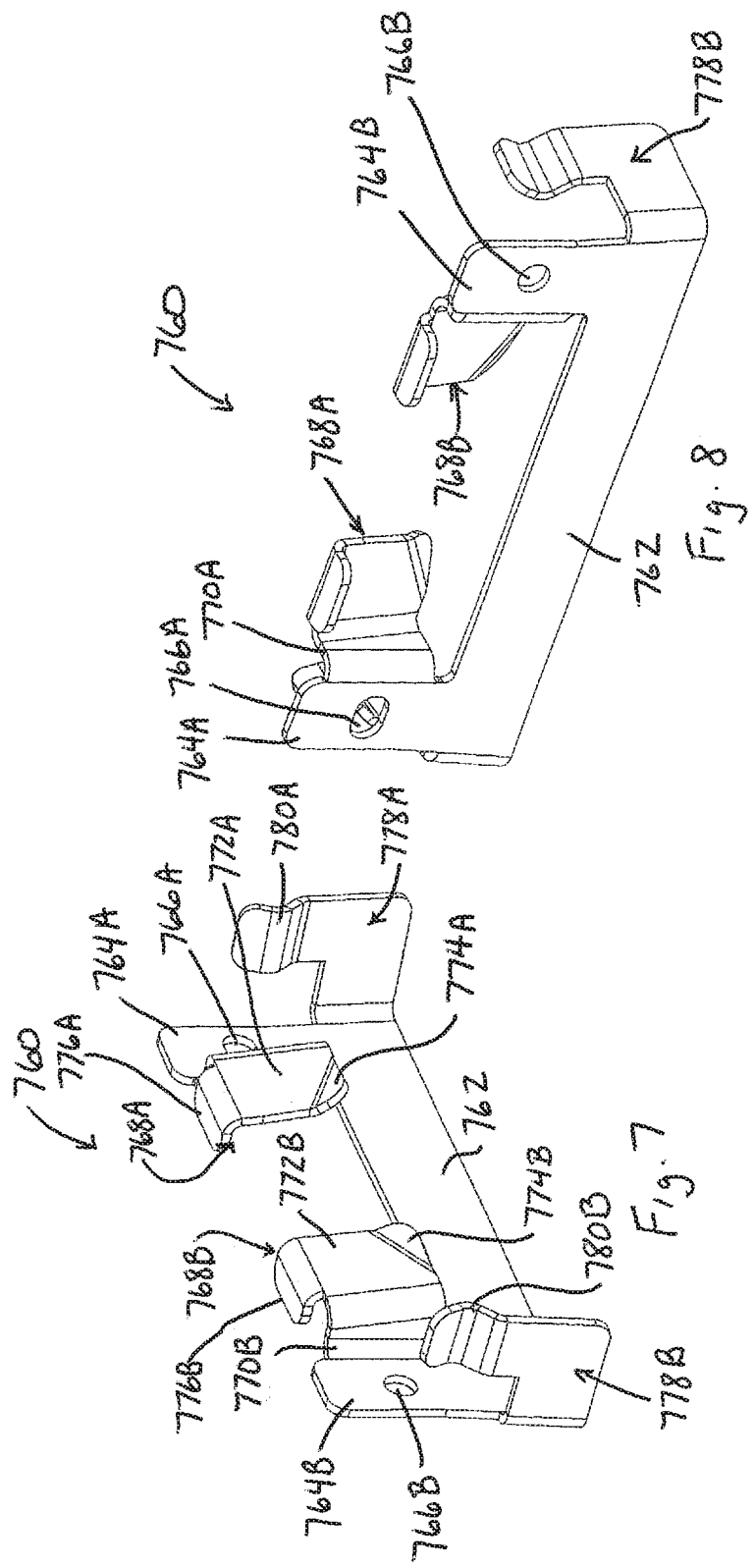

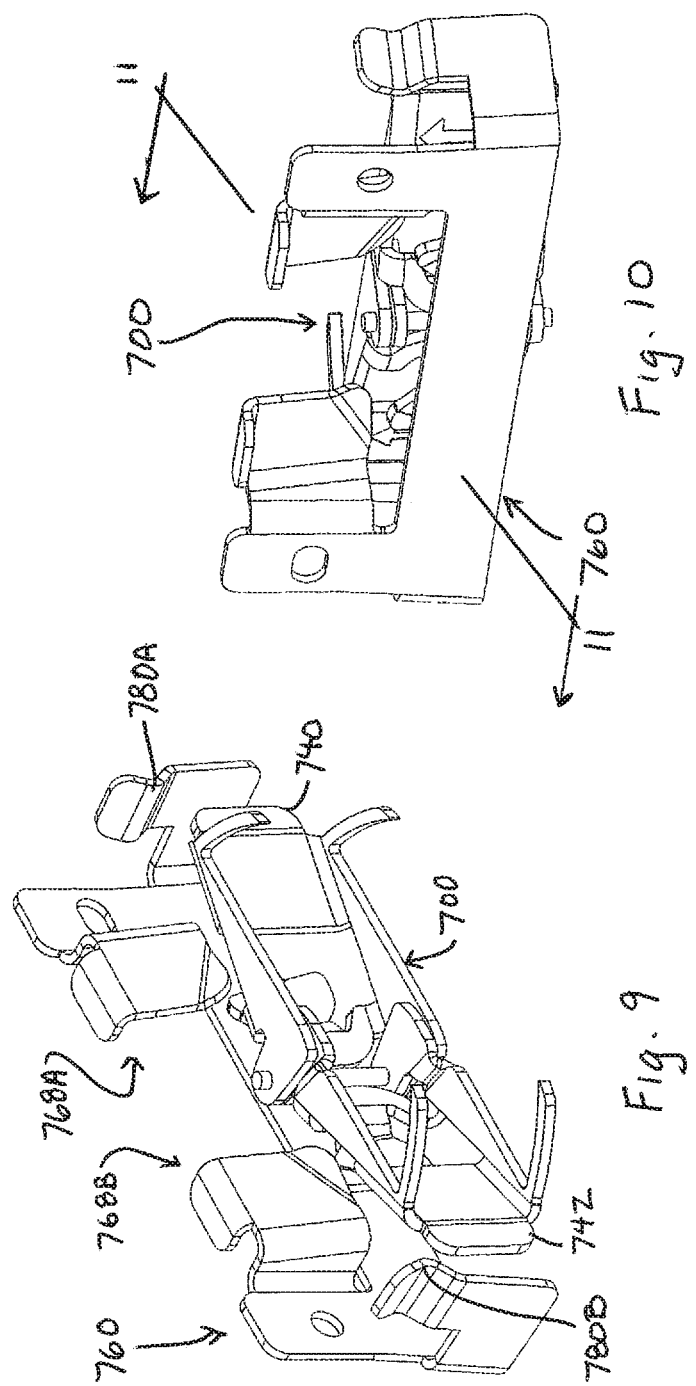

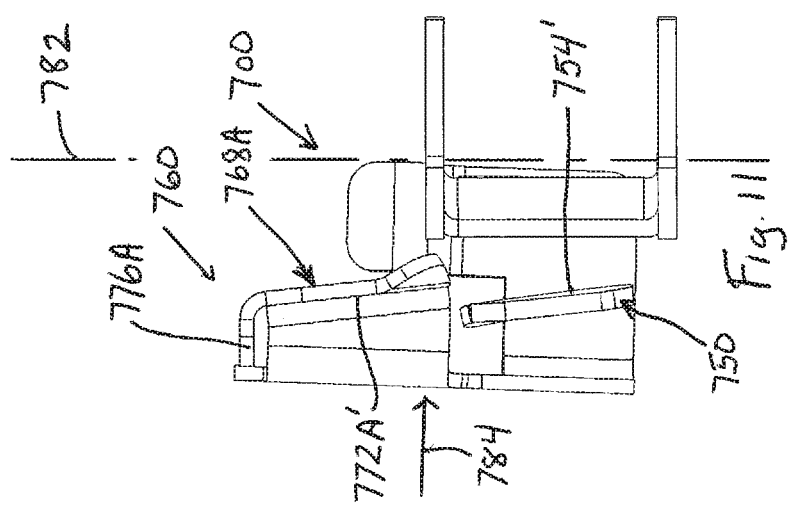

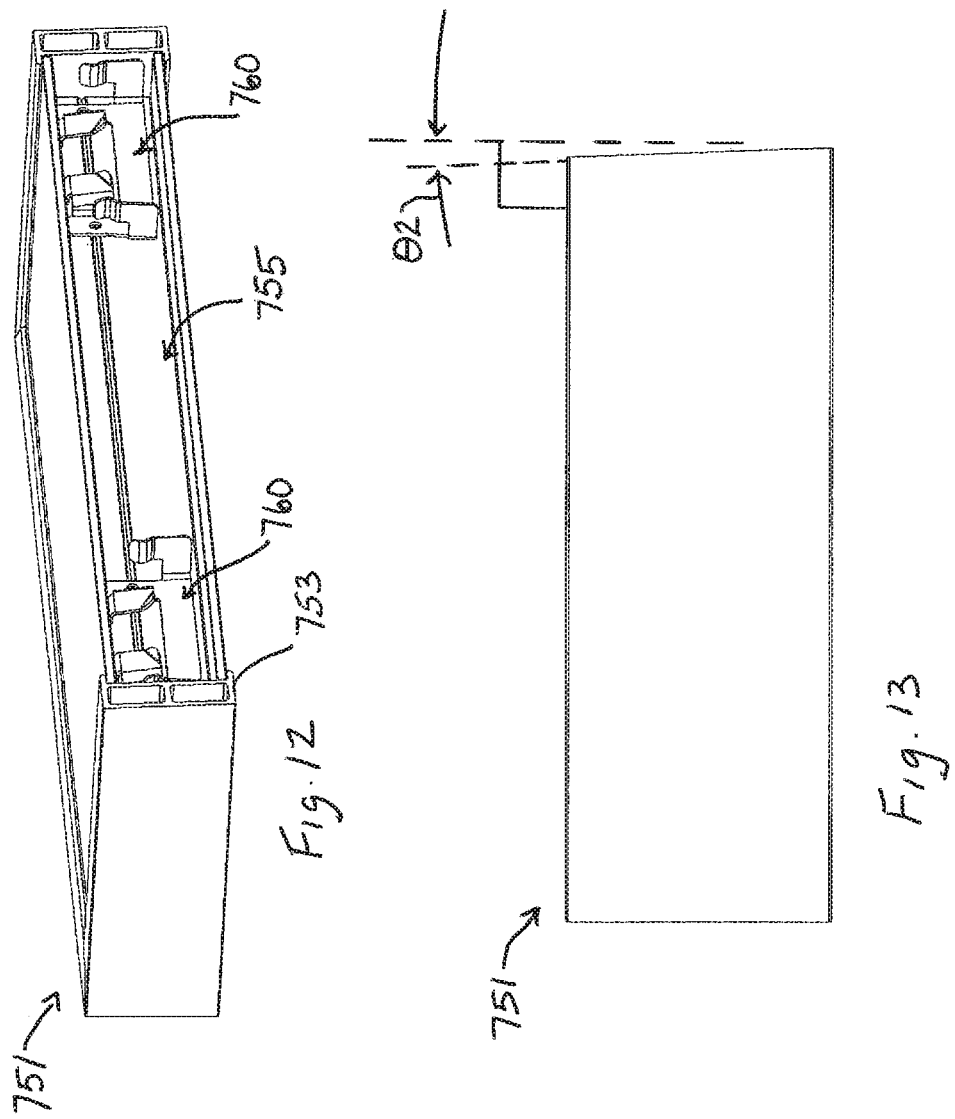

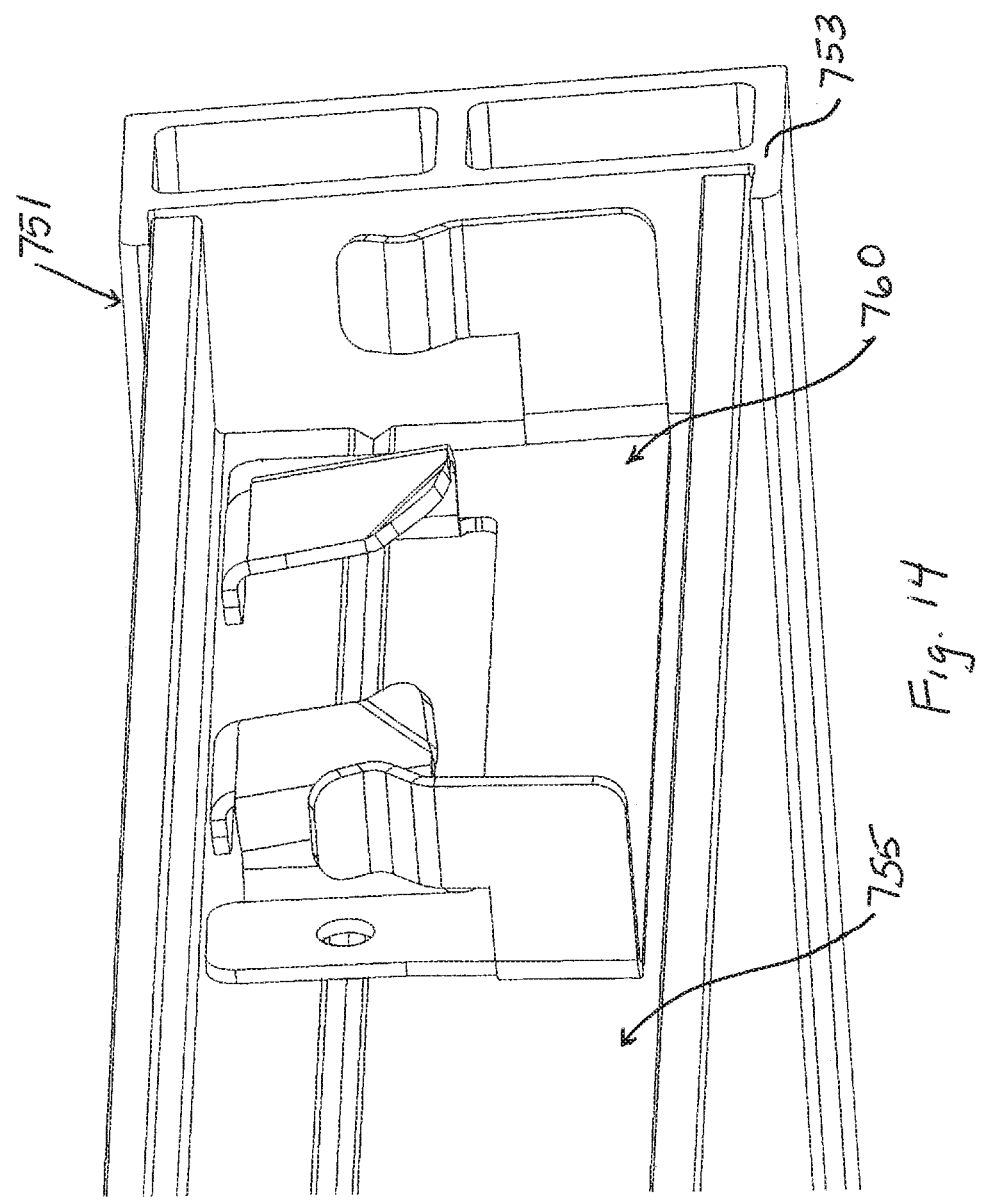

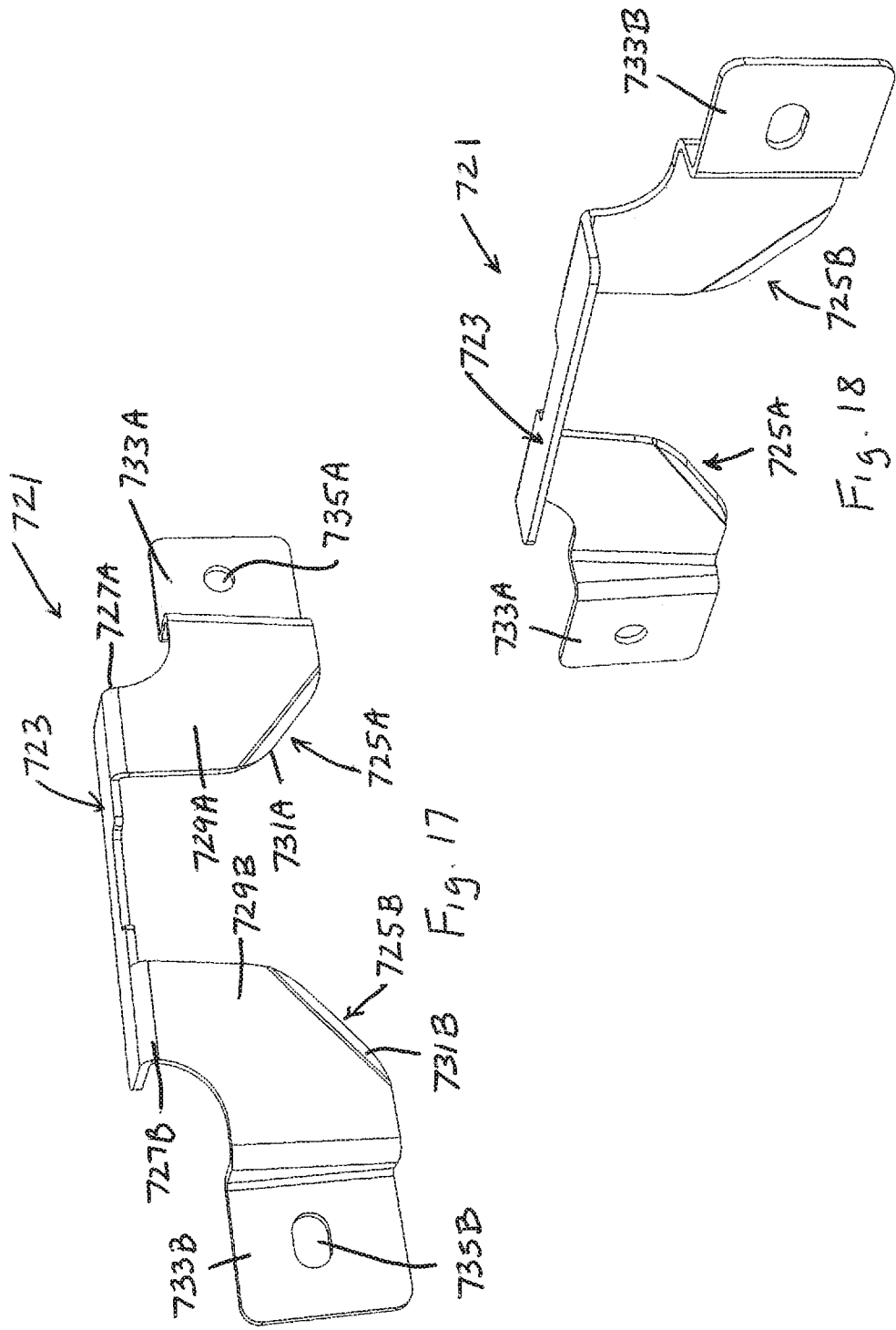

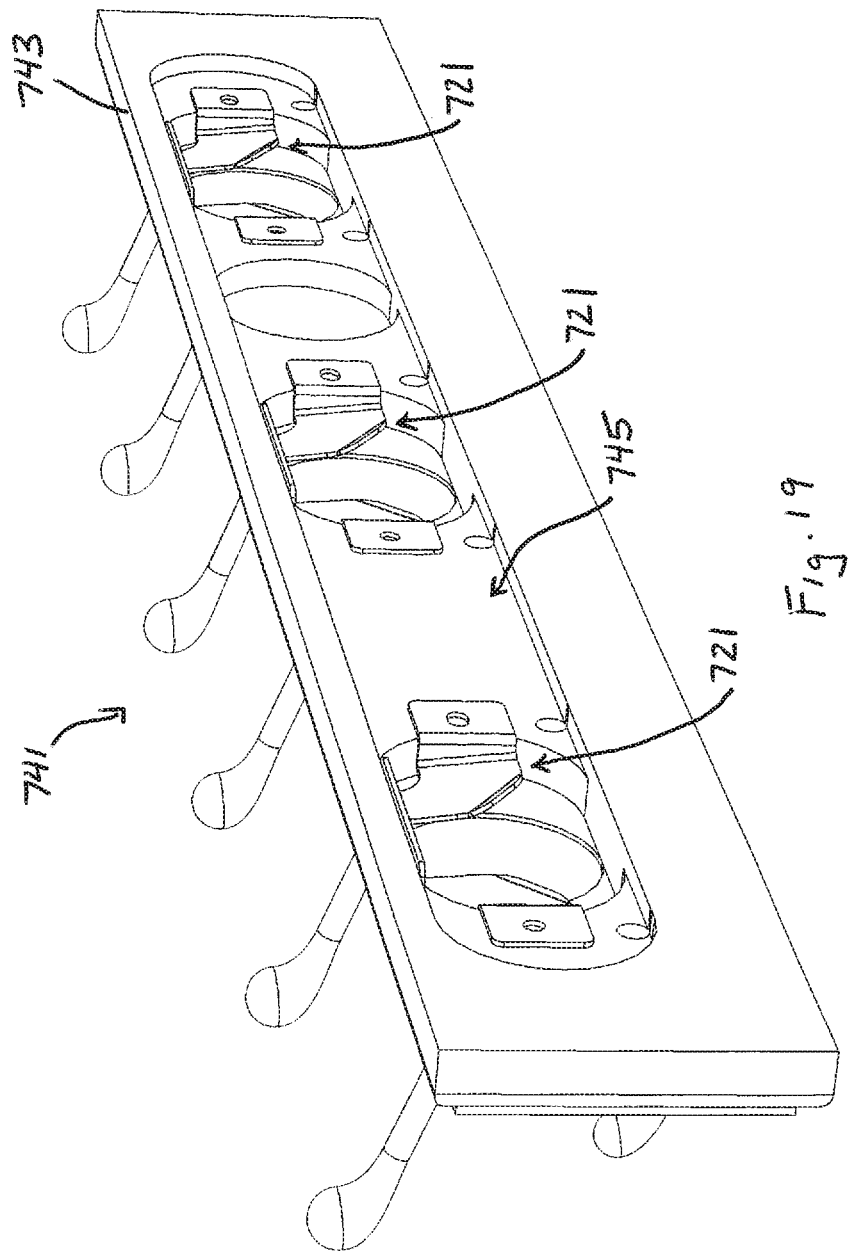

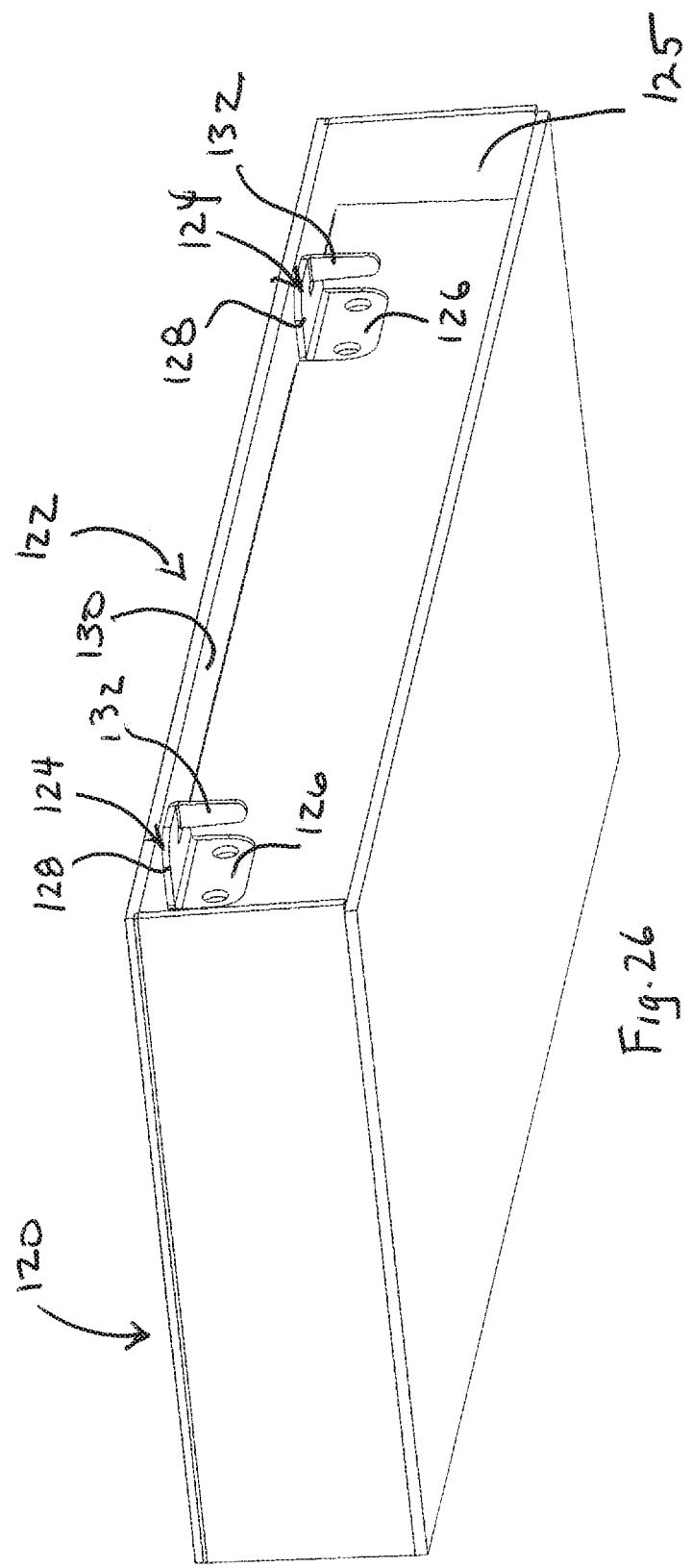

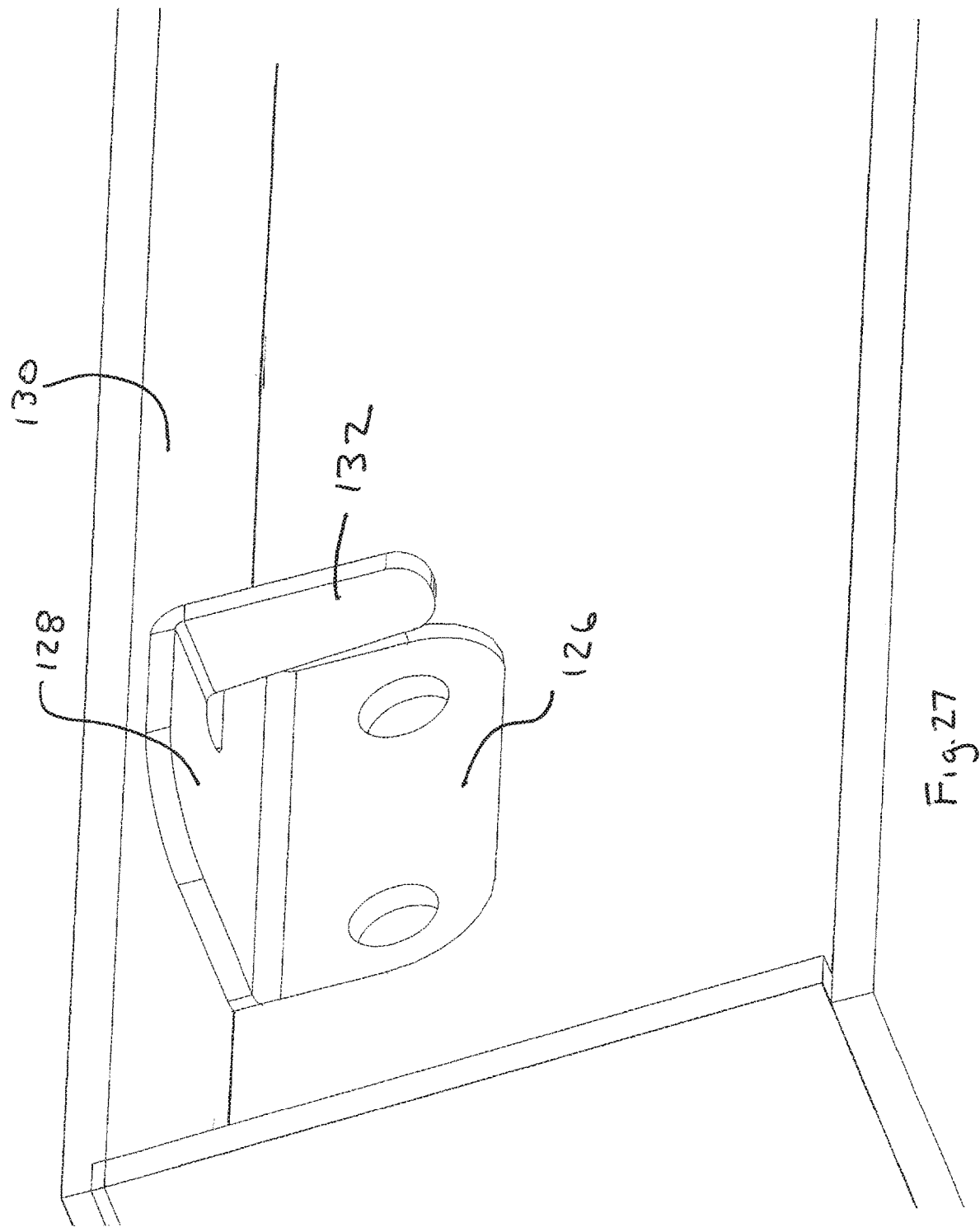

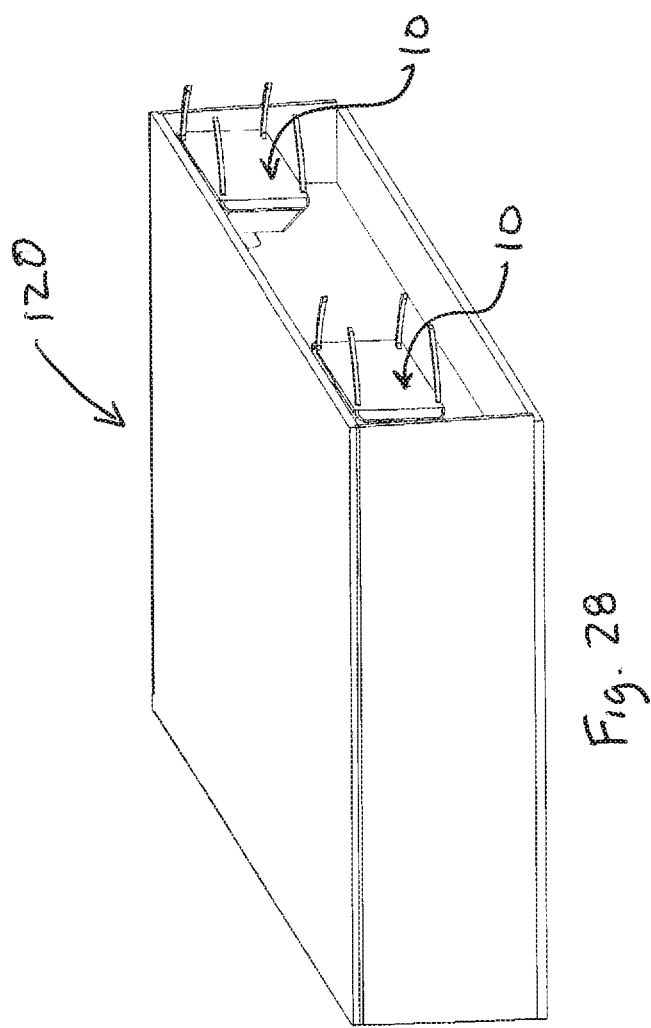

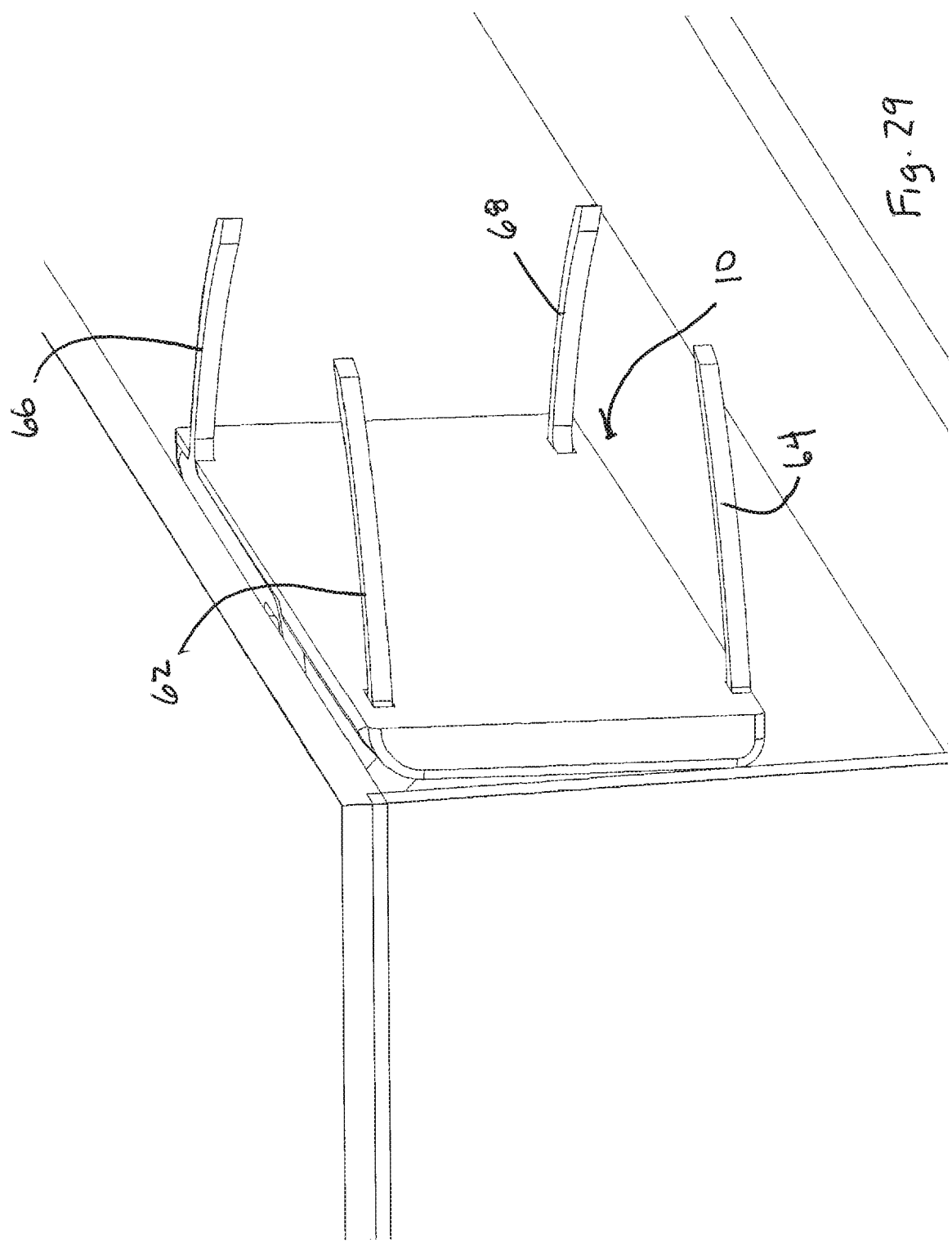

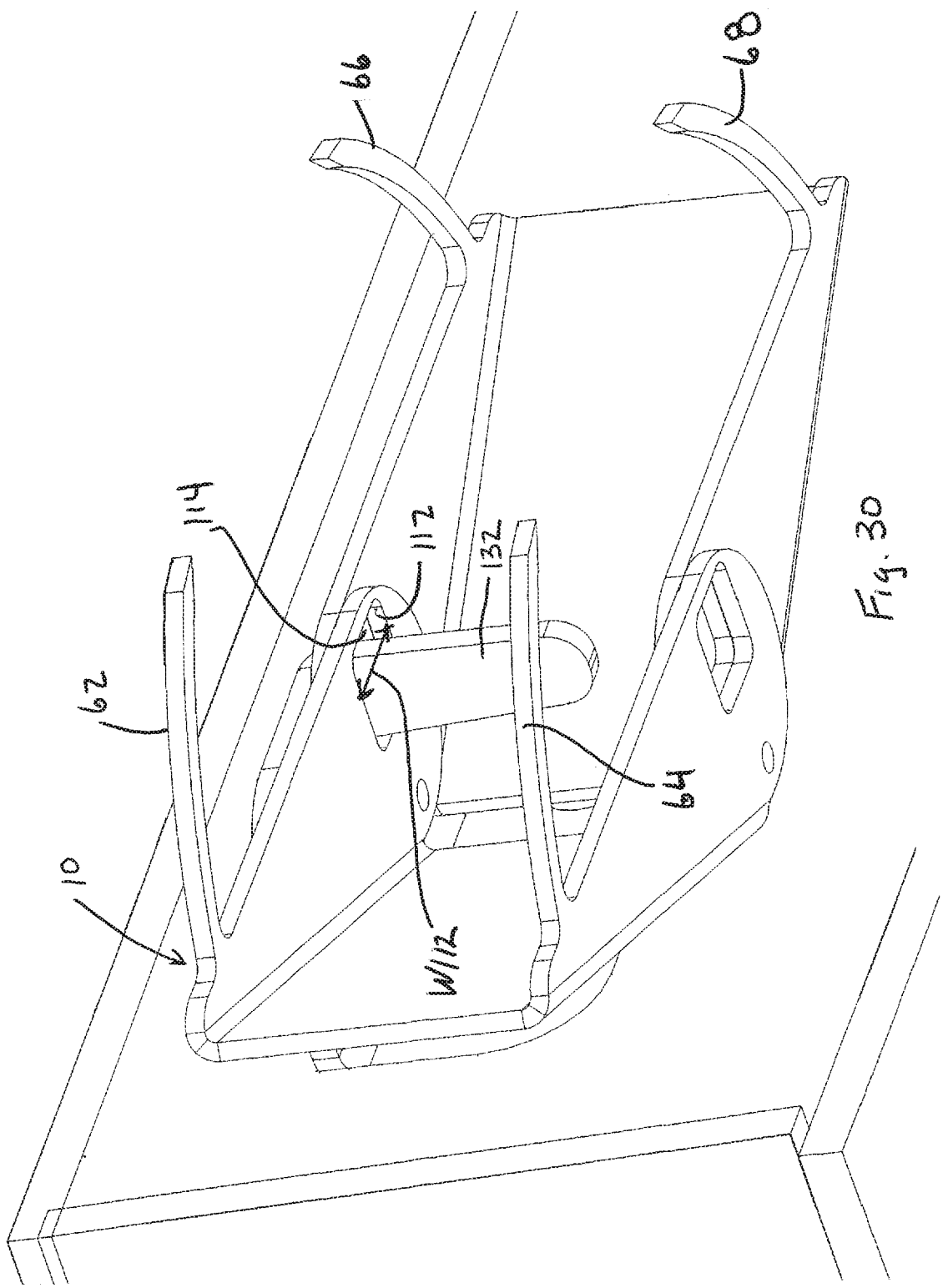

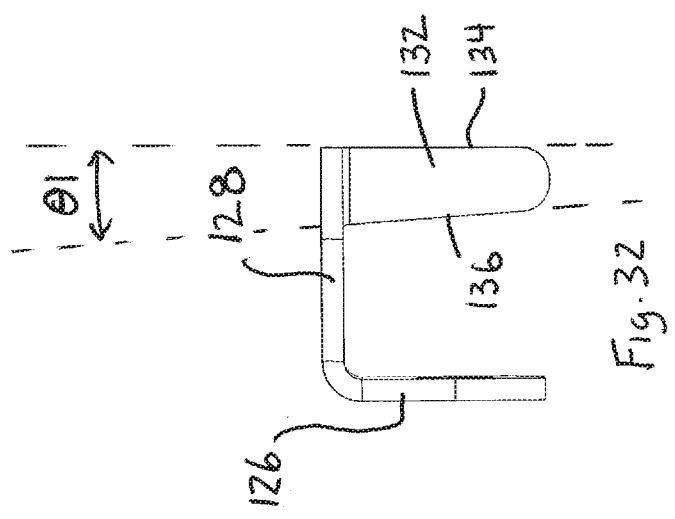
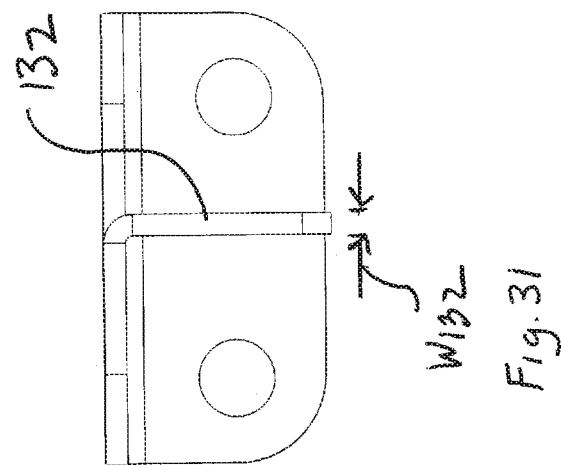

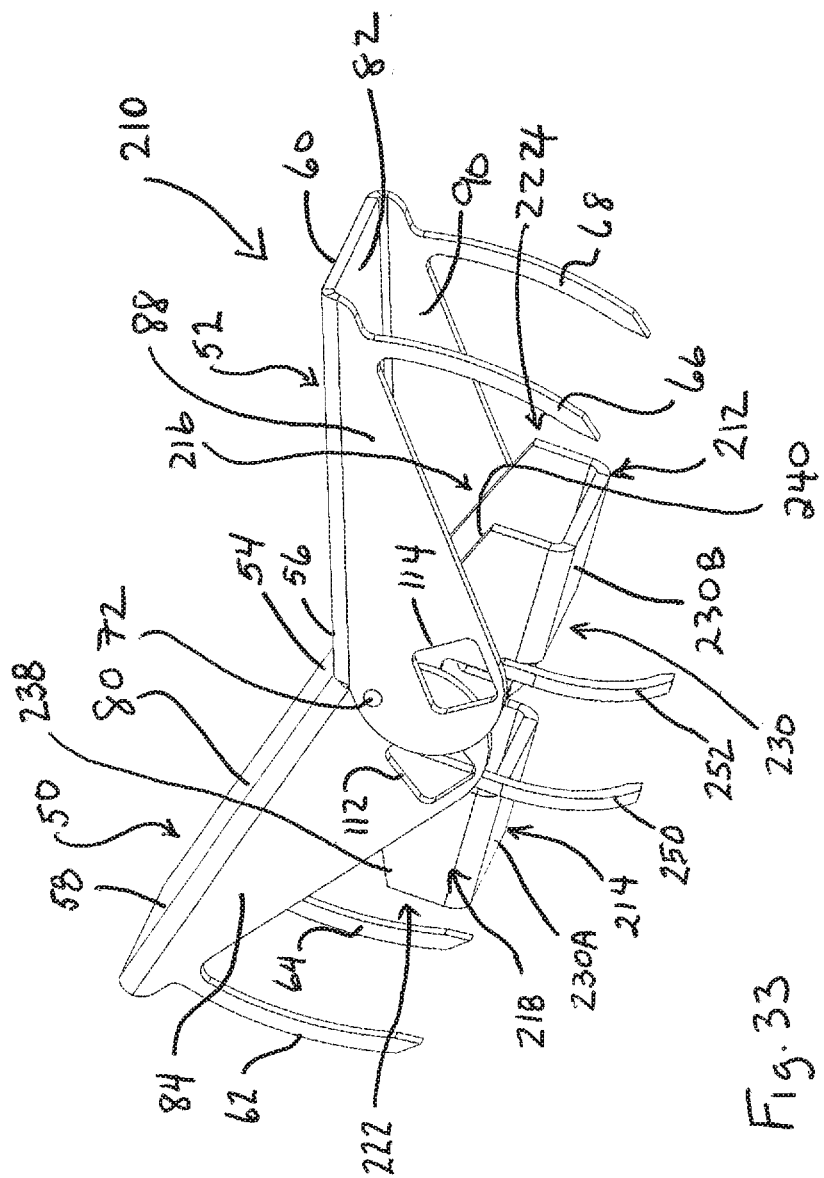

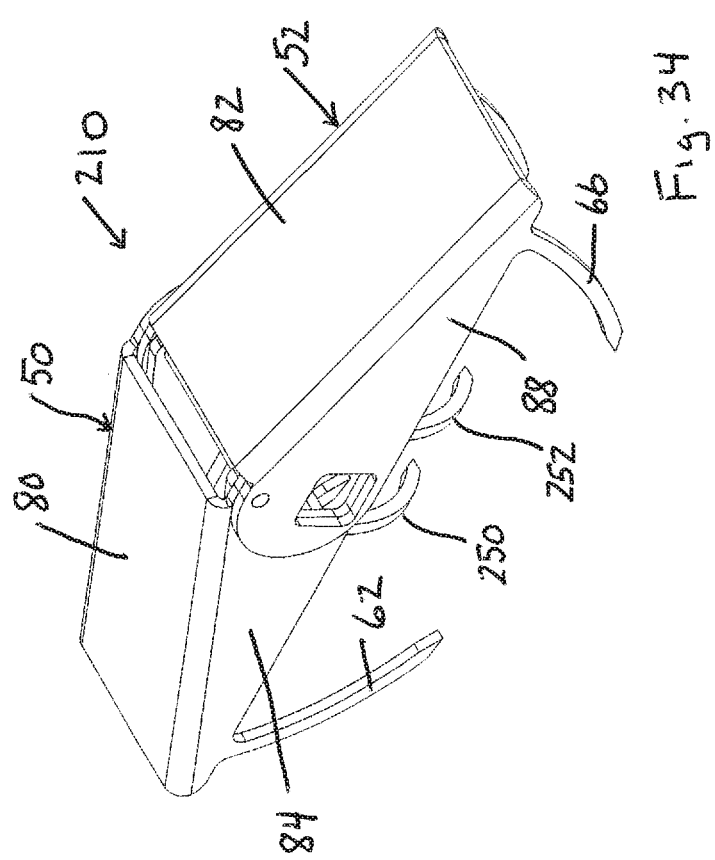

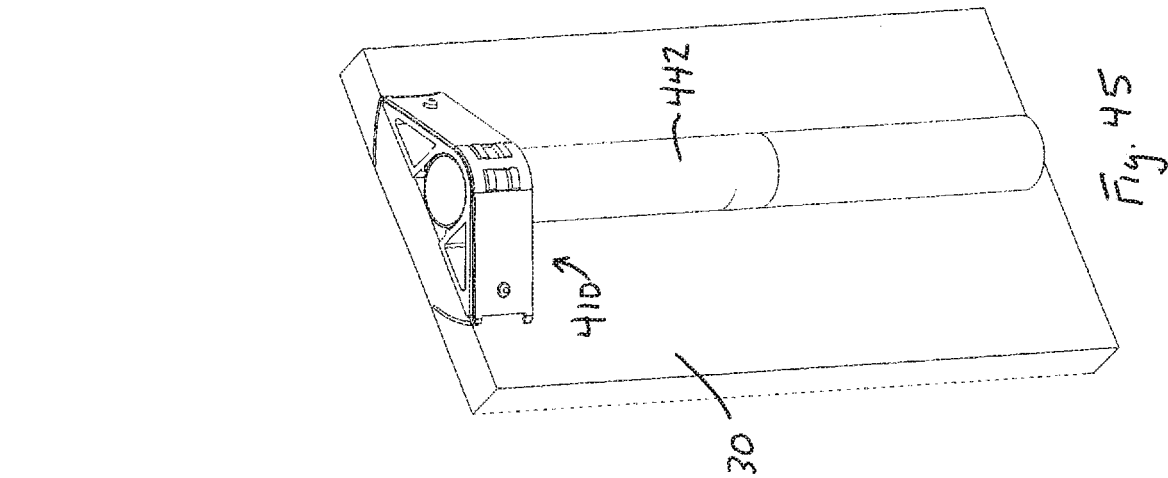
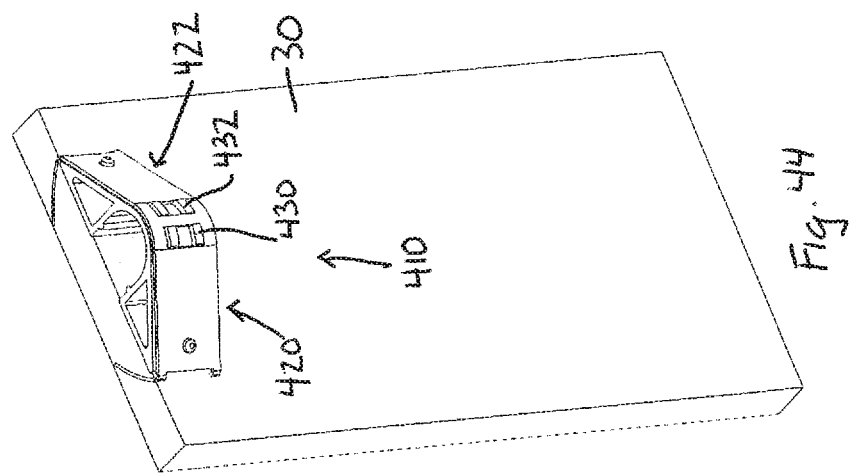
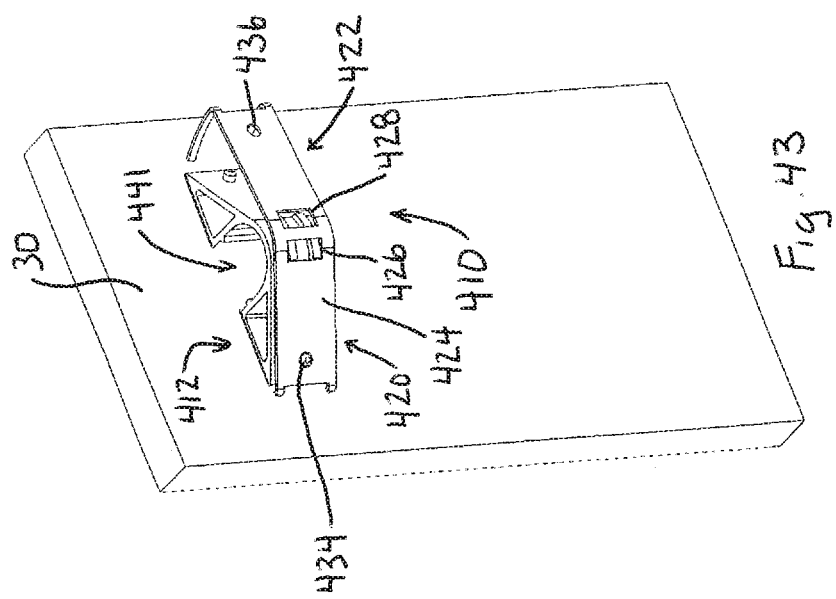

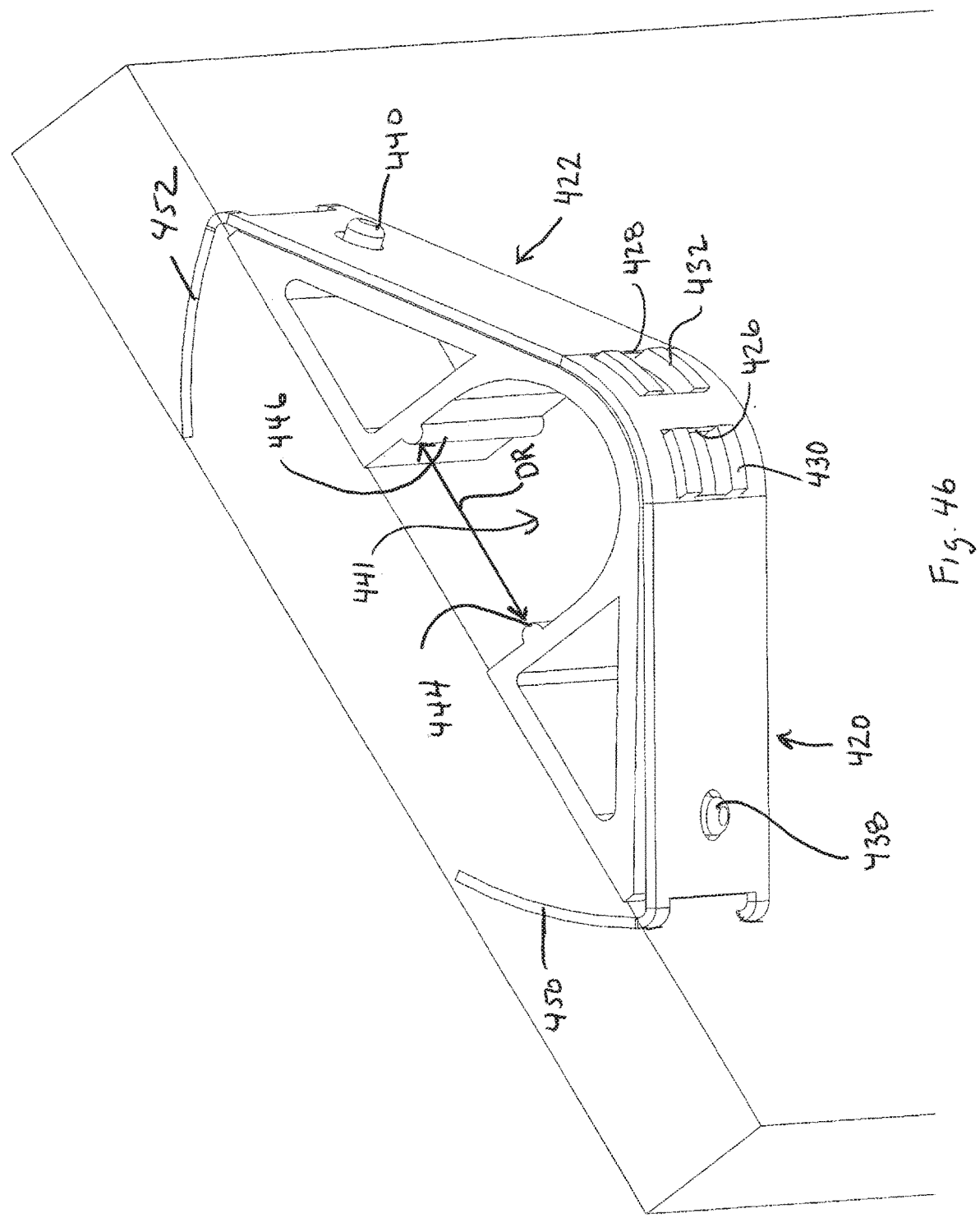

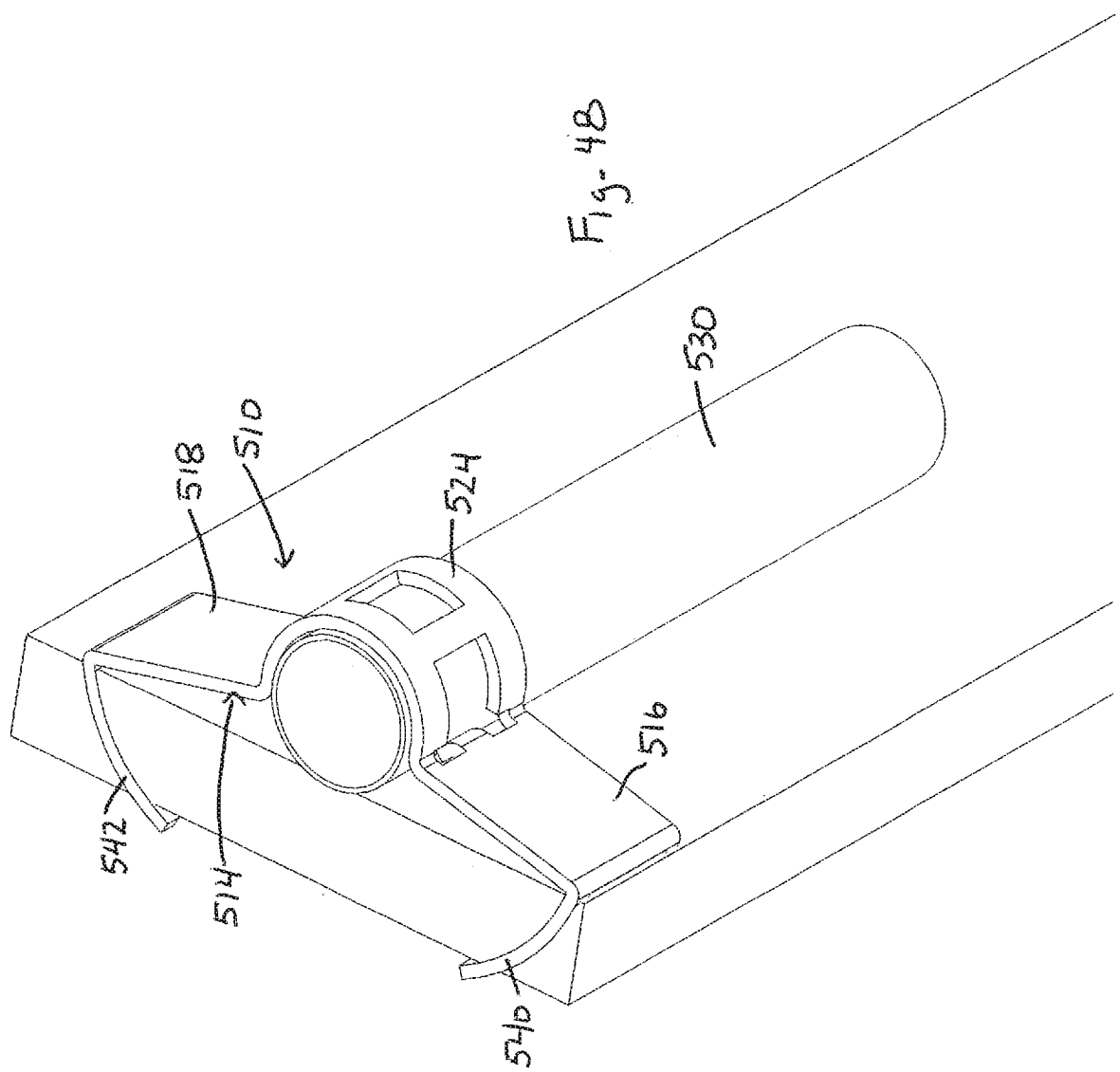

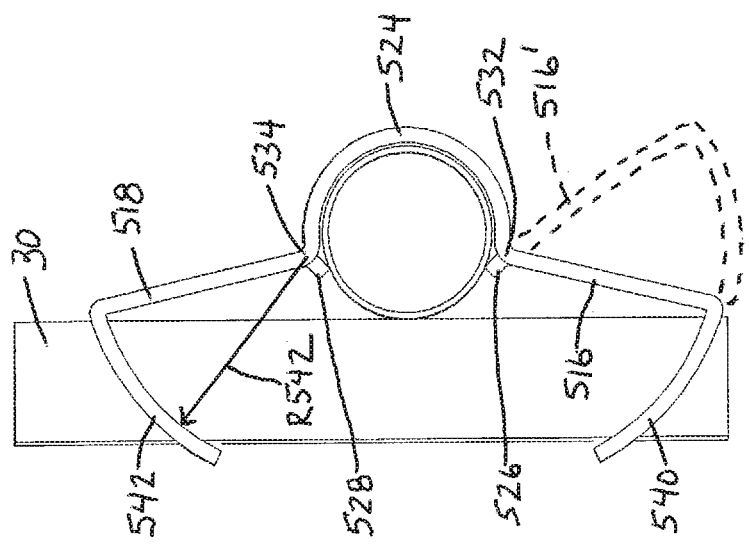

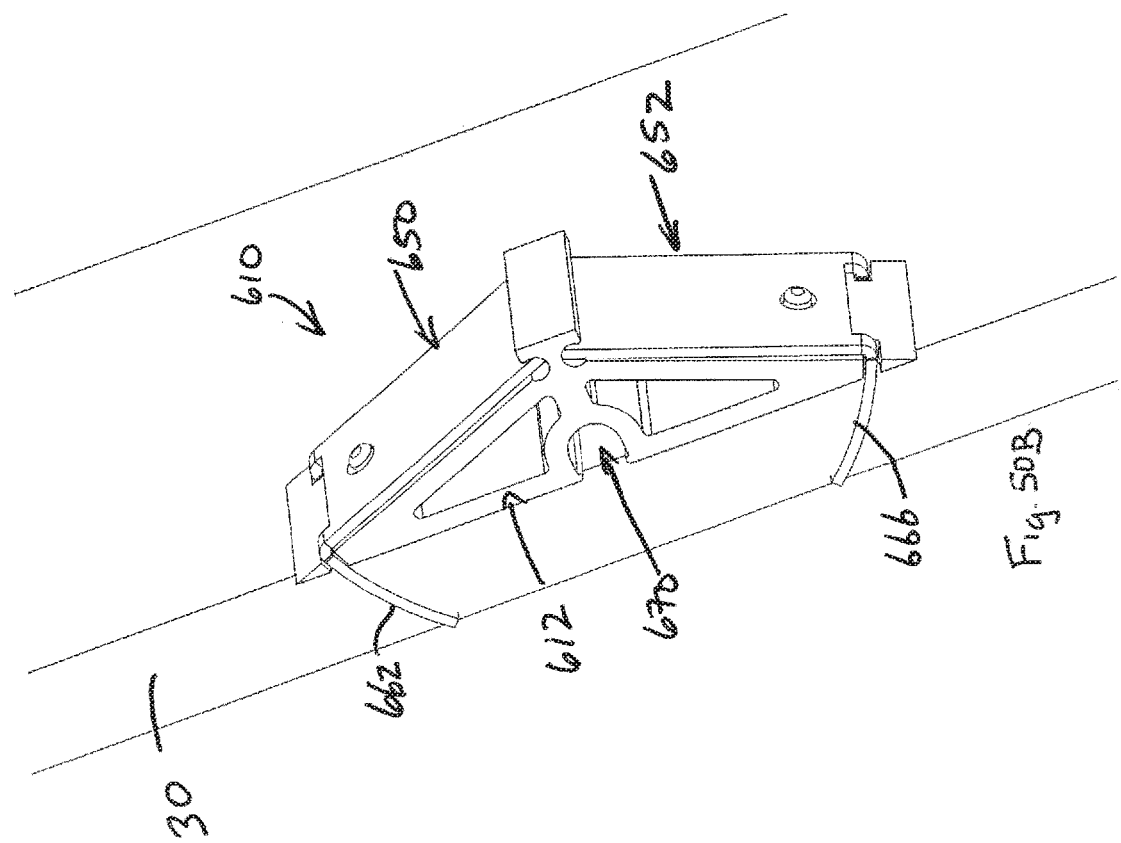
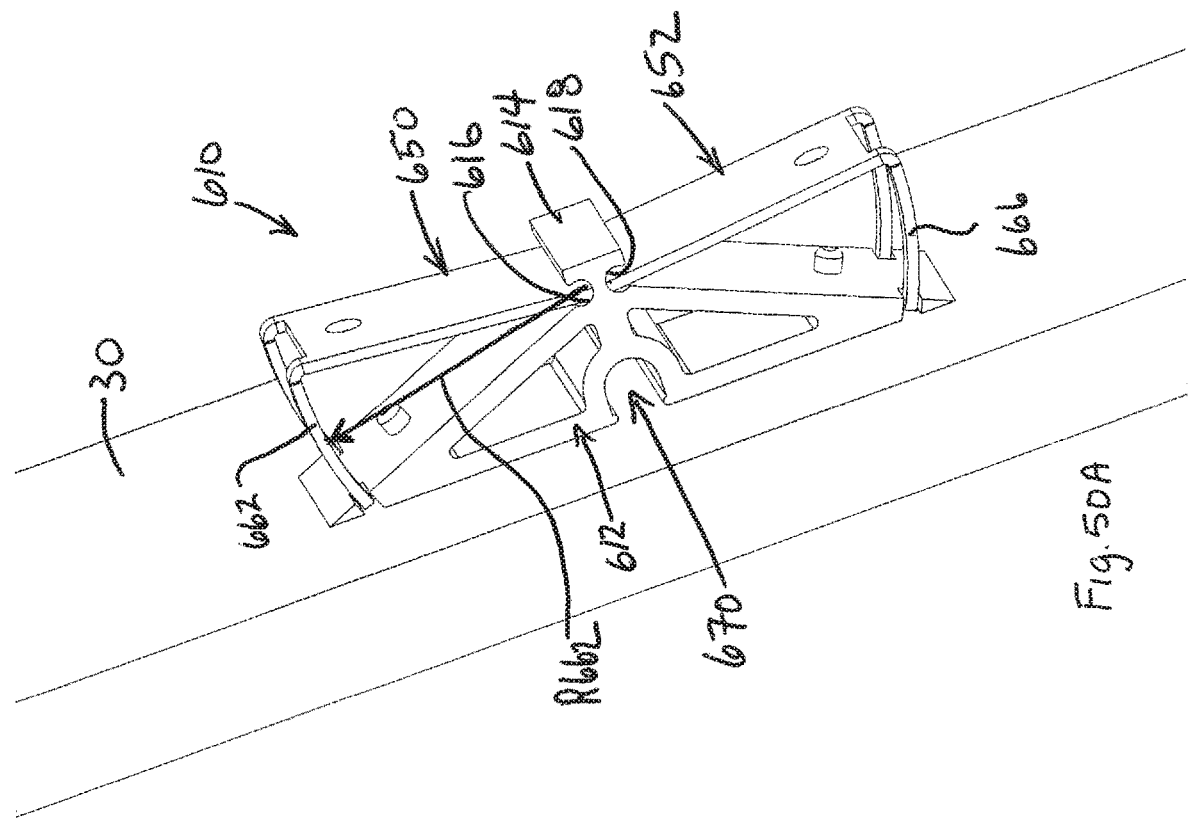

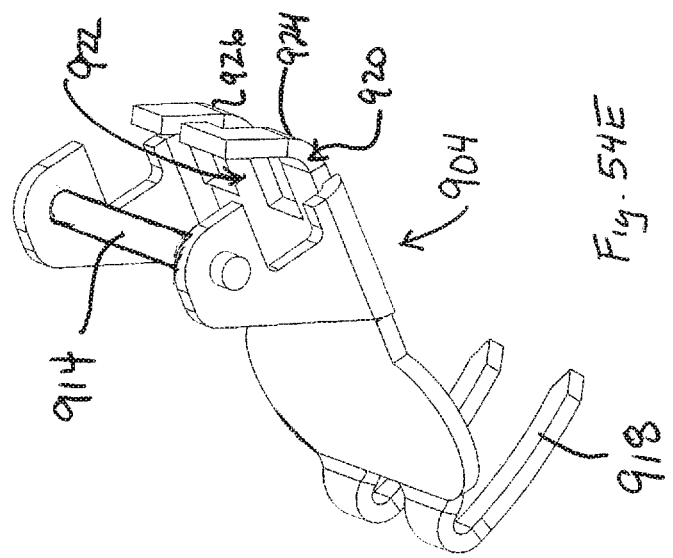
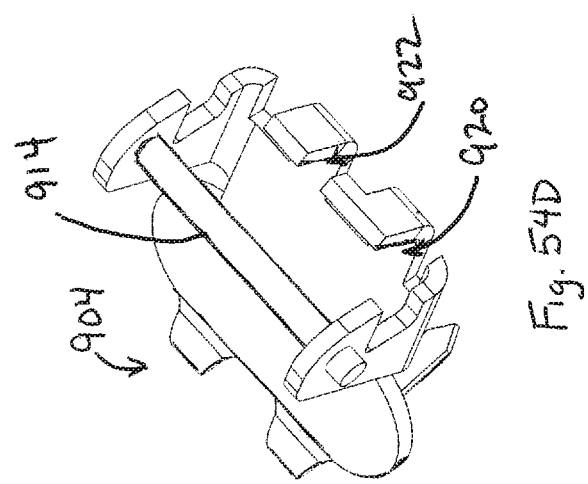

WALL ANCHORS AND RELATED WALL MOUNT SYSTEMS

TECHNICAL FIELD

This application relates generally to wall anchors and related systems, methods and components.

BACKGROUND

Numerous products exist for mounting components onto a wall. Conventional nails and screws are not always convenient solutions and may not provide sufficient support strength in the wall, particularly in the case of drywall, or other friable wallboards, which are relatively weak.

Anchors incorporating curved saber tooth shaped retainers are known from U.S. Pat. Nos. 8,974,166 and 8,414,239. However, such anchors are still difficult for the typical homeowner to install and use properly because a hammer is generally needed to complete the anchor installation. These anchors also generally have a large wall penetration that tends to crumble and weaken the surrounding wall media adjacent the penetration and leave a large hole that is not easily repaired. It is also impractical to reposition these types of anchors after initial insertion in locations proximate the original hole for the purpose of making minor position adjustments. Moreover traditional anchors with simple hooks are not suited to mount a wide variety of objects in a secure manner.

It would be desirable to provide an anchor device and related installation method that facilitates ease of installation, but at the same time results in an anchor with a high support strength and less damage to the wallboard, leaving relatively small holes upon anchor removal and therefore also permitting minor position adjustments if needed. To provide these advantages in connection with an anchor that installs without reference to stud or other supporting structure location and/or without concern for wires or pipes behind the wall, would also be beneficial. In addition, providing an anchor assembly that provides a mounting system with enhanced resistance to loading perpendicular to the wall surface in order to secure numerous types of secondary components such as a shelf, towelbar, coat rack or similar devices, all of which generate cantilever loading on the anchor, would be desirable.

SUMMARY

In one aspect, an anchor assembly for hanging an object on a wall includes a first anchor component including a first pivot end and a first retainer end opposite the first retainer end, with at least one wall penetrating retainer extends from the first pivot end and includes a wall penetrating extent that protrudes rearwardly and has a curved configuration. A second anchor component includes a second pivot end and a second retainer end opposite the second retainer end, the second retainer end pivotably connected to the first retainer end, to enable pivoting movement of both the first anchor component and the second anchor component between respective forward positions and respective install positions, where at least one wall penetrating retainer extends from the second retainer end and includes a wall penetrating extent that protrudes rearwardly and has a curved configuration. When the first anchor component is in its install position and the second anchor component is in its install position, the curved configuration of the wall penetrating extent of the second anchor component opposes the curved configuration of the wall penetrating extent of the first anchor component to form a jaw-type arrangement.

In another aspect, an anchor assembly for anchoring an object on a wall includes a first anchor component and second anchor component, each anchor component pivotable relative to the assembly and having a back side and a front side, and each anchor component having at least one curved wall penetrating retainer extending therefrom. The anchor assembly has an install orientation in the wall in which the wall penetrating retainer of each anchor component is inserted within the wall, wherein in the install orientation each retainer has a respective angle of attack that is less than eighty degrees.

In another aspect, an anchor assembly for anchoring an object on a wall includes a base member including a wall facing side, an outer side, a first lateral side extending from the wall facing side to the outer side, a second lateral side extending from the wall facing side to the outer side, and first and second ends. The wall facing side includes a base surface for seating against the wall, the outer side includes a first anchor support surface and a second anchor support surface, wherein the first anchor support surface and the base surface are nonparallel, wherein the second anchor support surface and base surface are nonparallel. A first anchor component is positioned on the base member and having a pivot end and a retainer end, and a second anchor component is positioned on the base member and having a pivot end and a retainer end.

In another aspect, an anchor assembly for anchoring an elongate component to a wall includes a first anchor component pivotably associated with the anchor assembly, the first anchor component having a pivot end and a retainer end, at least one curved wall penetrating retainer extending from the retainer end. A second anchor component pivotably associated with the anchor assembly, the second anchor component having a pivot end and a retainer end, at least one curved wall penetrating retainer extending from the retainer end. A tubular shaped passage has an open rear side enabling the passage to be placed over a tubular member.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1-6 show one embodiment of an anchor assembly;

FIGS. 7-8 show one embodiment of a mount bracket attachable to the anchor assembly of FIG. 1;

FIGS. 9-11 show a mount bracket of FIG. 7 in position for downward engagement with the anchor assembly of FIG. 1, where FIG. 11 is a cross-section taken along line 11-11 of FIG. 10;

FIGS. 12-14 show one embodiment of a shelf unit including the mount bracket of FIG. 7;

FIGS. 17-18 show another embodiment of a mount bracket attachable to the anchor assembly of FIG. 1;

FIG. 19 shows one embodiment of a hook rail including the mount bracket of FIG. 17;

FIGS. 26-27 show one embodiment of a shelf unit with mount brackets for engaging the anchor assembly of FIG. 20;

FIGS. 28-30 show the shelf unit of FIG. 26 attached to the anchor assembly of FIG. 20;

FIGS. 31-32 show the mount bracket of the shelf unit of FIG. 26;

FIGS. 33-39 show another embodiment of an anchor assembly;

FIGS. 43-47 show another embodiment of an anchor assembly;

FIGS. 48-49 show another embodiment of an anchor assembly;

FIGS. 50A-50B show another embodiment of anchor assembly;

FIGS. 54A-54E show another embodiment of an anchor assembly;

DETAILED DESCRIPTION

Figure 5:
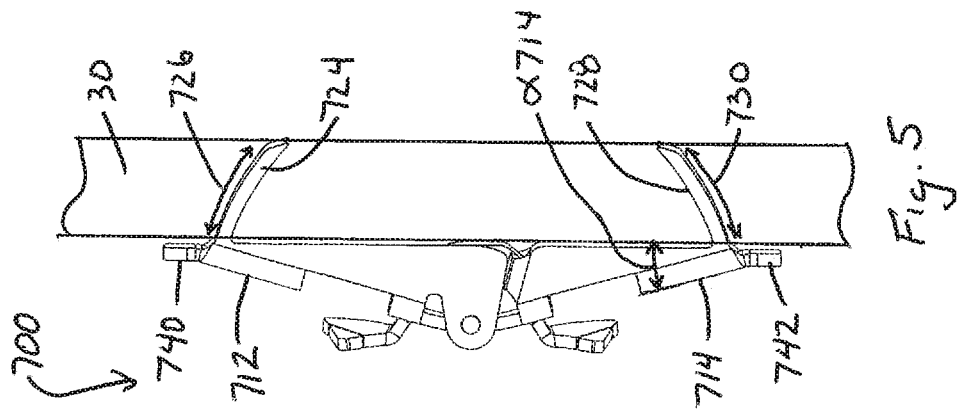

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Figure 4:
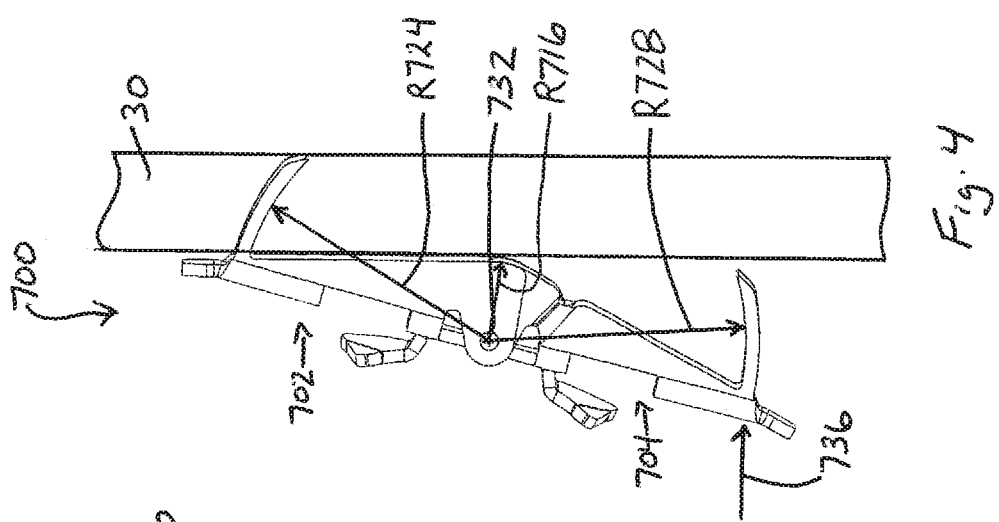
Figure 3:
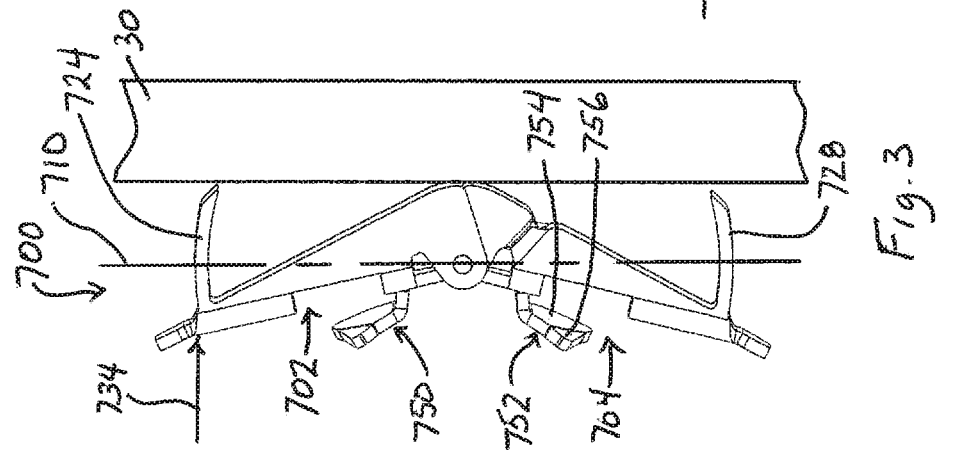

Referring to FIGS. 1-6, an anchor assembly 700 is shown. The anchor assembly 700 includes a pair of anchor components 702 and 704 pivotably engaged with each other so that anchor components can move between an non-anchoring orientation or forward position (e.g., FIGS. 1-3) and an anchoring orientation or install position (e.g., FIGS. 5 and 6). Anchor component 702 includes a base 706 having front, back, top, bottom, inner and outer sides, and anchor component 704 includes a base 708 having front, back, top, bottom, inner and outer sides. In the illustrated configuration it is contemplated that the anchor assembly 700 will be installed into a wall 30 with an elongate axis 710 of the assembly substantially horizontal, and therefore the views of FIGS. 3-5 represent top plan views, the view of FIG. 6 is a side elevation and the back or rearward side of each anchor component is considered the wall facing side. The inner sides of the two anchor components 702 and 704 overlap to enable pivoting connection of the two components via a hinge pin or pivot pin 748. Thus, the inner sides may also be referred to as the pivot ends of the anchor components.

In the illustrated embodiment, the base of each anchor component includes a primary plate element 712, 714 (e.g., generally rectangular in shape) and upper 716, 718 and lower 720, 722 plate elements (e.g., generally triangular in shape) extending from the primary plate element toward the wall facing side of anchor assembly. The upper and lower plate elements may also be referred to as lateral plate elements as they lie in planes that are generally lateral or horizontal. It is recognized that different configurations for the base portions are possible as will be evident from other embodiments described below. One or more wall penetrating retainers 724 (in the illustrated case a pair of spaced apart upper and lower retainers) extend from the base 706, each retainer having a corresponding wall penetrating extent 726 with a primarily curved configuration, and one or more wall penetrating retainers 728 (in the illustrated case a pair of spaced apart upper and lower retainers) extend from the base 708, each retainer having a corresponding wall penetrating extent 730 with a primarily curved configuration. The wall penetrating retainers 724 and 728 are located toward the outer sides of the respective anchor component bases 706 and 708. Thus, the outer sides may also be referred to as the retainer ends of the anchor components.

The wall penetrating retainers 724, 728 have a primarily curved configuration, with the wall penetrating extents having an arcuate configuration. The radius of curvature (e.g., R724 and R728) defined by the arcuate extents of the wall penetrating retainers have a center point that is proximate to the axial pivot point line or axis 732 of each anchor component, which is centered on the hinge pin 748. In this regard, in the illustrated embodiment each anchor component is pivotally connected to the hinge pin 748 via end portions of a hinge pin 748 that pass through aligned pin openings in the upper 716, 718 and lower 720, 722 plate elements, and thus the centers of the radii of curvature of the wall penetrating retainers are co-linear. This geometry reduces the energy and force required to insert each set of retainers, reduces damage to the wall and results in small wall surface perforations when the anchor is removed.

In the illustrated embodiment, each curved wall penetrating retainer 724 extends from a respective one of the plate elements 716, 720, and each wall penetrating retainer 728 extends from a respective one of the plate elements 718, 720. The anchor components may thus be formed from a metal plate material, and be unitary or monolithic in construction. However, other variations are possible. The retainer ends of the upper plate elements 716, 718 partially overlap and the retainer ends of the lower plate elements 720, 722 partially overlap to achieve the hinge pin connection.

In the illustrated embodiment each anchor component is formed of monolithic metal plate construction in which a flat metal plate is cut to a certain flat shape and then bent into the final shape of the component (e.g., by progressive die stamping). However, it is recognized that other forms of anchor components are possible in connection with the anchor assemblies.

For the purpose of wall installation, while the anchor components 702, 704 are in their non-anchoring orientations (also seen as forward positions) the assembly is held against the surface of the wall (per FIG. 3) and then the retainer end of one anchor component (e.g., 702 in FIGS. 3 and 4) is pressed toward the wall (per arrow 734) to rotate the retainers (e.g., 724) into the wall 30. The center portion of the anchor assembly may be held in one hand to maintain assembly position while the other hand is used to move the one anchor component into the wall. Next, the retainer end of the other anchor component (e.g., 704 in FIGS. 4 and 5) is pressed toward the wall (per arrow 736) to rotate the retainers 728 into the wall 30. Thus, the two anchor components may be pressed toward the wall in a staged operation (e.g., one at a time). This two stage method of retainer penetration results in an anchor assembly with a suitable number of retainers to hold larger weights without requiring excessive force to move the retainers into the wall. The retainer end of anchor component 704 has a smaller vertical dimension that fits within the retainer end of anchor component 702, to enable overlap of the upper and lower plate elements and thus the upper plate elements 716, 718 slide against each other or move in close proximity to each other as the anchor components are pivoted during installation. Likewise, the lower plate elements 720, 722 slide against each other or move in close proximity to each other.

The final install position results in a jaw-type gripping action of the anchor assembly into the wall per FIG. 5. The gripping action supports high hanging loads and loads with a moment component, such as a shelf loads, towel bars, coatracks etc. that can be supported on the anchor assembly. In the final install position, the rear edges of the upper 716, 718 and lower 720, 722 plate elements abut against the surface of the wall, or install template described below, to provide additional stability of the anchor assembly in the wall. Thus, these edges define a wall mount plane or mount surface plane of the assembly when the anchor assembly is in the anchoring orientation. Notably, the inner ends of the plate elements are formed with arcuate portions with a radius of curvature (e.g., R716) that is centered on the axis 732), which allows the plate elements to readily slide relative to the wall or other mount surface during anchor component installation.

The retainers of the illustrated embodiment have a primarily rectangular cross-section for cross-sections taken normal to a curved lengthwise axis of the retainer. In some implementations where the rectangular cross-section is non-square, a longer dimension of the cross-section of all retainers 724 and 728 may all run in similar orientations (e.g., in this case all generally parallel to the lengthwise axis 710). In other implementations the orientation of the longer dimension may vary as between retainers on the same anchor or as between retainers on one anchor and retainers on the other anchor.

The retainer end of each anchor component includes a side tab 740, 742 that extends from the primary plate element 712, 714 in a forward direction. The side tabs 740, 742 may thus be oriented substantially parallel to the wall surface upon final install (per FIG. 5), while the primary plate elements 712, 714 are angled relative to the wall surface at a non-zero angle (e.g., per angle α714).

In addition to the primary plate element 712, strap member 744 extends between upper plate element 716 and lower plate element 720, and in addition to the primary plate element 714, strap member 746 extends between upper plate element 718 and lower plate element 722, in both cases at the front or forward side of the respective anchor component. In both cases the strap member is spaced from the primary plate element toward the pivot end of the anchor component. Each strap member 744, 746 supports a respective mount wing 750, 752 that extends therefrom. Each mount wing 750, 752 extends slightly forward of the strap member to which it connected and also toward retainer end of the anchor component to which it is connected. As best seen in FIGS. 3 and 6 with reference to mount wing 752, each mount wing includes a major portion 754 and a minor portion 756 which bends slightly forward of the major portion. The back side of major portion 754 defines a mount engagement surface lying in a plane 758 and the back side of minor portion 756 defines a mount entry surface. Upon installation of the anchor assembly, with the mount engagement surface of major portion 754 angles away from the wall surface when moving upward, which is represented by an angle φ1 between the plane 758 and the axis 732, which angle may be in the range of about 1 degree to about 15 degrees, such as about 5 to 10 degrees, though other variations are possible. The mount engagement surface may also be slightly angled relative to the wall surface when moving from left to right, or visa versa. The anchor assembly 700 can be used to mount various different components to a wall, with the mount wings 750 and 752 providing structure that engages with a suitable structure on a mount bracket of the component.

By way of example, reference is made to the mount bracket 760 of FIGS. 7 and 8, which includes a base 762 with upwardly extending attachment arms 764A, 764B having openings 766A, 766B through which a fastener can pass for attaching the mount bracket to a component to be supported on the anchor assembly. One or both of the openings may be laterally elongated (in this case just opening 766A). Mount wings 768A, 768B extend rearwardly and inwardly from the arms 764A, 764B. The mount wings include respective connecting parts 770A, 770B, major portions 772A, 772B, minor portions 774A, 774B and upper stop tabs 776A, 776B. Side guide arms 778A, 778B extend from respective ends of the base 762, and have upwardly extending guide tabs 780A, 780B with bends to facilitate installation onto the anchor assembly.

In the illustrated embodiment the mount bracket is formed of monolithic metal plate construction in which a flat metal plate is cut to a certain flat shape and then bent into the final shape of the bracket (e.g., by progressive die stamping). However, it is recognized that other forms of mount brackets are possible.

Reference is made to FIGS. 9-11 showing a mount bracket 760 positioned vertically above an anchor assembly 700 in position for downward engagement onto the anchor assembly, where a lateral spacing between the mount wings 768A and 768B and a lateral spacing between the anchor assembly wings 750 and 752 (not shown in FIGS. 9-11) is set to assure contact of the major portions of the mount wings with the major portions of the anchor assembly wings when the mount bracket 760 is moved down onto the anchor assembly. In addition, the side guide tabs 780A, 780B of the mount bracket will interact with the side tabs 740, 742 of the anchor assembly to move the mount bracket 760 laterally in the event of an incorrect lateral alignment of the mount bracket 760 over the anchor assembly 700. The angles of the respective minor portions of the mount wings 768A, 768B and minor portions of the anchor assembly wings 750, 752 provide a lead in feature to prevent jamming as the bracket 760 moves down onto the anchor assembly 700. Moreover, the forward surfaces of the major portions of the mount wings 768A, 768B interact with the rearward surfaces of the major portions of the anchor assembly wings 750, 752 as the bracket 760 moves down in a manner that pulls the bracket toward the wall plane 782 (e.g., per surfaces 772A' and surfaces 754' in FIG. 11 that will interact to pull the bracket 760 in the direction of arrow 784 as the bracket 760 moves down. Once the stop tabs on the mount bracket wings engage the top of the anchor assembly wings (e.g., per stop tab 776A moving down to engage top of wing 750 in FIG. 11), further downward movement of the mount bracket is prevented and the mount bracket is fully engaged with the anchor assembly.

In practice, the bracket 760 can be attached to any component to be hung on the wall-installed anchor assembly 700. By way of example, reference is made to FIGS. 12-14 showing an exemplary floating shelf assembly configured for support by a pair of spaced apart anchor assemblies. The shelf 751 is of a floating shelf type which, when mounted, appears to project out of the wall surface, and has no visible wall supports. In this regard, the back side 753 of the shelf includes a recessed area 755 that is bounded on all sides, and that has spaced apart brackets 760 mounted therein (e.g., by screws). Alternatively, the bracket structure could, for example, be formed monolithically with the shelf (e.g., where the shelf is molded of plastic and the brackets molded of plastic) or, in another example, the shelf may be of molded plastic with brackets of metal being insert molded with the shelf. While two brackets are shown, components with only a single bracket and components with three or more brackets are also contemplated.

In the case of the illustrated shelf 751, after two anchor assemblies 700 have been properly positioned and installed in a wall, the shelf can be mounted onto the anchor assemblies by aligning the shelf brackets 760 above the anchor assemblies and then moving the shelf downward to engage the brackets with the anchor assemblies. As previously described, interaction between the bracket wings and the anchor assembly wings will operate to pull the rear side of the shelf unit 751 toward the wall so as to be flush with the wall. In this regard, in order to reduce or eliminate downward sag of the shelf as it protrudes off the wall (particularly the upper shelf surface), as shown in FIG. 13 the rear edges of the shelf may lie in a plane that is slightly offset from vertical, or slightly offset from perpendicular to the upper surface (e.g., as suggested by angle $\Theta 2$ in the range of between about 0.5 and 3 degrees, such as about 1.5 to 2.5 degrees). During the shelf mount process, as the shelf is moved downward onto the anchor assemblies, the wing surface interaction will tend to cause the upper end of the shelf to pivot about the lower end of the shelf toward the wall.

Moreover, as the rear surface of the shelf unit 751 engages with the wall surface during install, a preloading occurs as a result of the interaction of the anchor wings and shelf wings that tends to pull the shelf against the wall with a preload normal force (e.g., in the range of 5 to 15 pounds normal to the wall, such 8 to 12 pounds, though other variations are possible). This preload force acts to limit shelf deflection due to application loading until the loading generates forces equal to the preload. The wings of the mount brackets and anchor assemblies can also be configured to permit some flexing or elastic deflection away from respective normal positions under load, which acts to allow installation of the shelf to the anchor with reduced friction with the wall and to absorb minor application load impulse forces.

Figure 15:
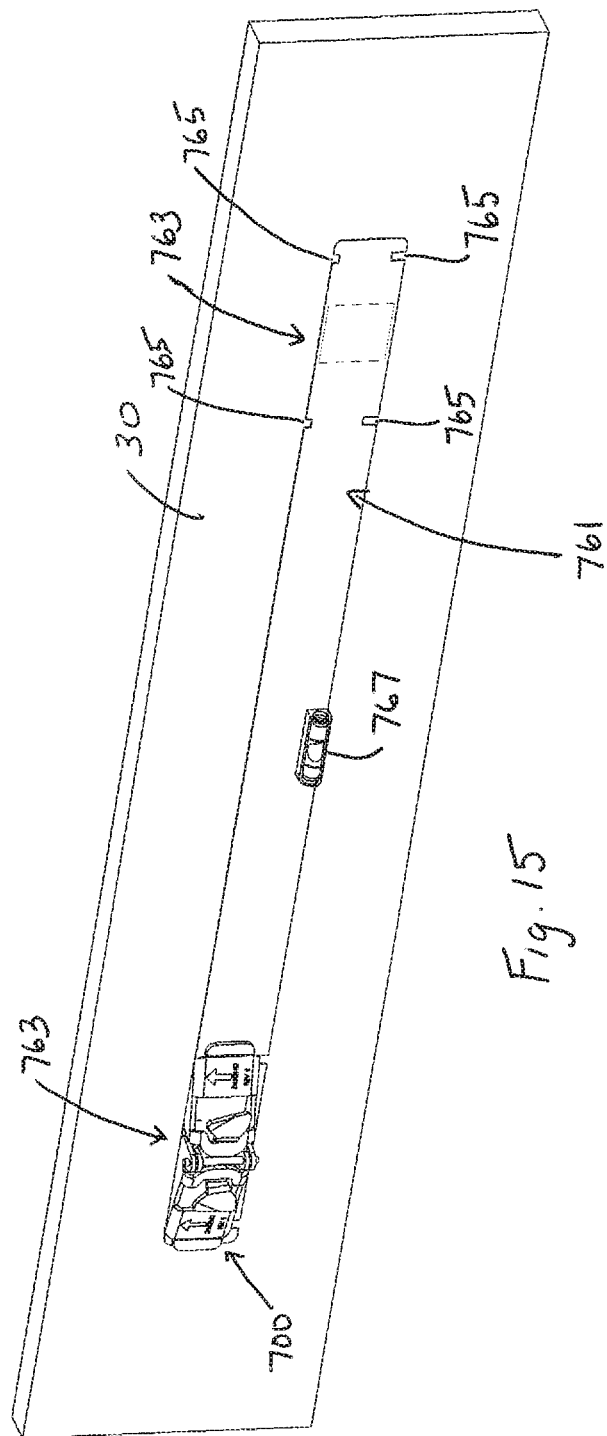
FIGS. 15-16 show one embodiment of a template system.
Figure 16:
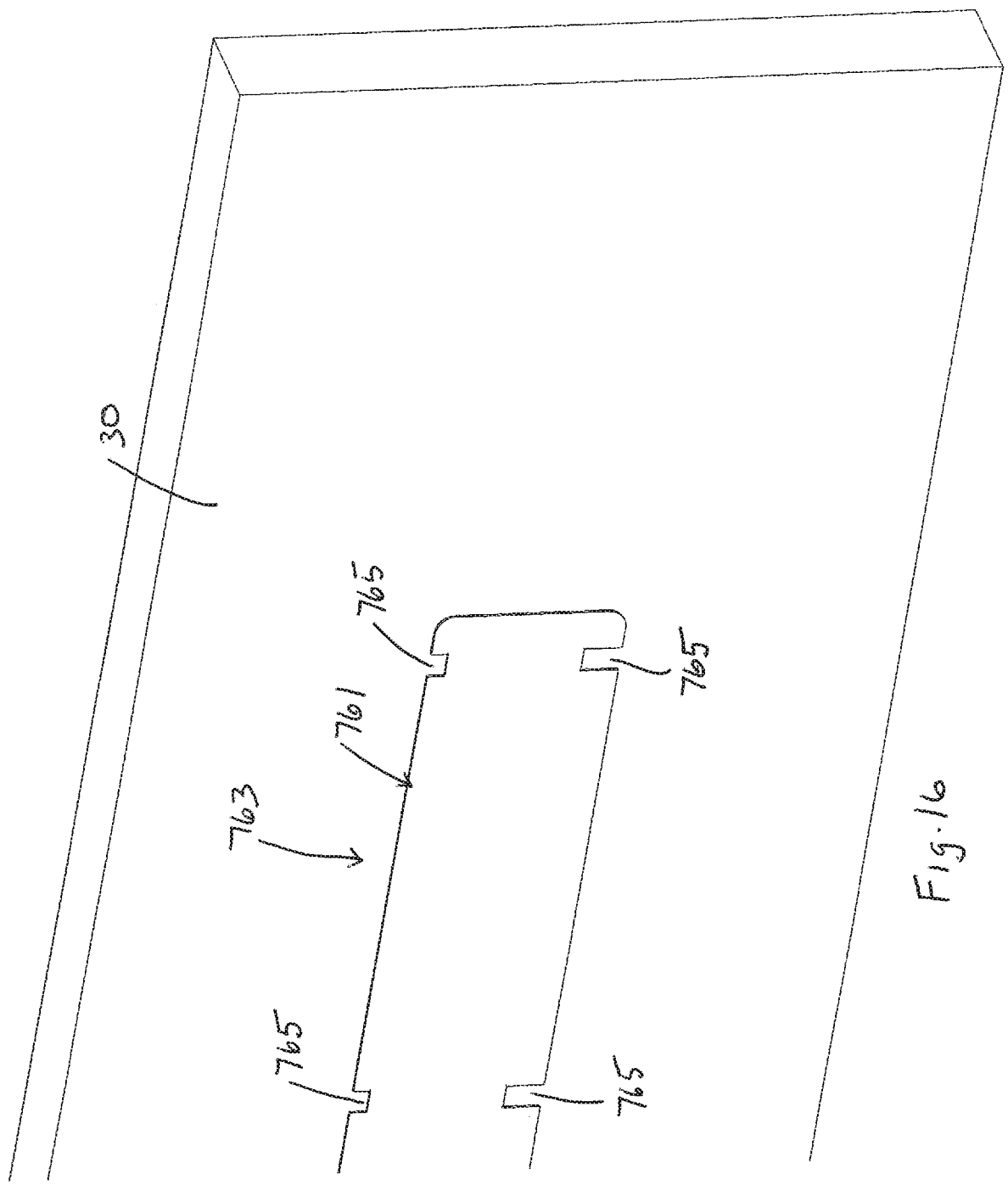

In terms of proper positioning of the anchor assemblies onto the wall, as seen in FIGS. 15 and 16, a template system would be particularly useful for installations that require more than one anchor assembly (e.g., where the secondary component mounts to more than one anchor assembly as in the case of above-described shelf shelf 751). An exemplary template 761 is shown and includes spaced apart anchor receiving zones 763 defined by slots or other openings 765. One anchor assembly 700 is shown installed in FIG. 15, while one anchor receiving zone 763 is empty. The slots 765 are spaced in such a manner as to enable the free ends of the anchor assembly retainers to be positioned therein when the anchor assembly 700 is opened to its non-anchoring orientation prior to install. The template 761 may include an adhesive feature at its wall facing side (e.g., one or more adhesive areas covered by a tape that is removed so that the template 761 can be temporarily applied to the wall). The adhesive is sufficient to hold the template 761 on the wall 30, while at the same time facilitating relatively easy removal of the template 761 from the wall (e.g., if desired for repositioning). In exemplary cases the template would remain on the wall once the anchor assemblies are installed. As shown, the template 761 could incorporate an integrated level element 767 (e.g., a bubble level) so that when the template 761 is placed on the wall a user can assure that the slots 765 are positioned in a manner that will enable mounting of anchor assemblies at the same height, resulting in a corresponding level mount of whatever component (e.g., shelf or speaker) will thereafter be mounted onto the installed anchor assemblies 700.

Generally, the spacing between the mount zones 763 would match the spacing between the mount bracket structure at the back of the component to be installed on the wall. While only two zones 763 are shown, more zones could be provided if the component to be mounted is configured for mounting to a greater number of anchor assemblies. The template may be formed of any suitable die-cut material such as paper, cardboard or plastic sheet.

It is recognized that other mount bracket configurations could also be used in conjunction with the anchor assemblies 700. As another example, reference is made to FIGS. 17 and 18 where another mount bracket 721 is shown. Mount bracket 721 includes an upper base 723 with end portions that act as stop tabs to engage the tops of mount wings on the anchor assembly. Mount wings 725A, 725B extend downwardly from the rear edge of the base 723. The mount wings include respective connecting parts 727A, 727B, major portions 729A, 729B and minor portions 731A, 731B. The major portions, minor portions and stop tabs of mount anchor 721 will function similar to those of mount anchor 760 when mount anchor 731 is engaged with an anchor assembly (but without minimal or no flexing—though designs can be contemplated where flexing is beneficial). Attachment arms 733A, 733B also connect to the wings and have openings 735A, 735B through which a fastener can pass for attaching the mount bracket 721 to a component to be supported on the anchor assembly. One or both of the openings may be laterally elongated (in this case just opening 735B). By way of example of a component utilizing the bracket 721, FIG. 19 shows an exemplary hook rail 741 with a base 743 having a recess 745 at its back side and three spaced apart mount brackets 721 secured within the recess 745. The alternative mount bracket 721 as particularly useful in connection with components where the recess in the component must necessarily be shallow.

While the above illustrated embodiments contemplate components that are mounted to laterally spaced apart anchor assemblies that are at the same height, it is recognized that the height of all anchor assemblies need not be the same and that in some cases the anchor assemblies could be spaced apart vertically one above the other. It is also recognized that other anchor assembly configurations and associated mount bracket configurations are possible.

Referring to FIGS. 20-25, an anchor assembly 10 is shown. The anchor assembly 10 includes a base member 12 including a wall facing side 14, outer side 16, lateral sides 18 and 20 and opposite ends 22 and 24. Lateral sides 18 and 20 extend from the wall facing side 14 to the outer side 16. The ends 22 and 24 are distal portions in a lengthwise (longer) direction or axis 26 of the base member.

The wall facing side 14 includes a base surface 29 for seating against a wall 30. In the illustrated example the base surface is a single planar surface, but it is recognized that variations are possible, such as the base surface being made up of multiple discreet surfaces that together lie in a common plane. The outer side 16 of the base member includes anchor support surfaces 32 and 34 that are angled relative to each other. In the illustrated embodiment the surfaces 32 and 34 converge toward each other as they move from respective ends 22 and 24 toward a mid-section of the base member, converging at an apex line 36. Both anchor support surfaces 32, 34 are nonparallel with the base surface 29, with the outer end 38, 40 of each anchor support surface positioned closer to the base surface 29 than the inner end 42, 44 of the anchor support surface. The anchor support surfaces 32 and 34 are substantially planar in this embodiment, but other variations are possible. It is contemplated that the base member 12 may be formed of a plastic or other polymeric material, but base members of metal or other materials are also possible.

Anchor components 50 and 52 are positioned on the base member 12. Each anchor component 50, 52 has a respective pivot end 54, 56 and a respective retainer end 58, 60. Anchor component 50 is pivotable relative to the base member 12 between a forward position (FIGS. 20 and 24) in which the retainer end 58 is spaced away from the anchor support surface 32 and an install position (FIG. 25) in which the retainer end 58 is positioned toward the anchor support surface 32. Likewise, anchor component 52 is pivotable relative to the base member 12 between a forward position (FIGS. 20 and 24) in which the retainer end 60 is spaced away from the anchor support surface 34 and an install position (FIG. 25) in which the retainer end 60 is positioned toward the anchor support surface 34. In the illustrated install position of each anchor component, a back side of the anchor seats against its adjacent anchor support surface.

The retainer end 58 includes curved wall penetrating retainers 62, 64 extending rearwardly such that when the anchor component 50 is in the forward position the curved wall penetrating retainers extend toward but not beyond the base surface 29 and when the anchor component is in the install position the curved wall penetrating retainers 62, 64 extend beyond the base surface to enable wall penetration. Likewise, the retainer end 60 includes curved wall penetrating retainers 66, 68 that extend rearwardly such that when the anchor component 52 is in the forward position the curved wall penetrating retainers extend toward but not beyond the base surface 29 and when the anchor component is in the install position the curved wall penetrating retainers 66, 68 extend beyond the base surface to enable wall penetration.

The wall penetrating retainers 62, 64, 66 and 68 have a primarily curved configuration, with the retainer portions that penetrate the wall being of an arcuate configuration. The radius of curvature (e.g., R62 and R66) defined by the arcuate portions of the wall penetrating retainers have a center point that is proximate to the axial pivot point line or axis 70 of each anchor component 50, 52. In this regard, in the illustrated embodiment each anchor component 50, 52 is pivotally connected to of the base member via end portions of a hinge pin or pivot pin 72 passing through the base member, and thus the center of the radius of curvature of each wall penetrating retainer are colinear, but other variations are possible. This geometry minimizes the energy and force required to insert each set of retainers, minimizes damage to the wall and results in small wall surface perforations when the anchor is removed.

Figure 25:
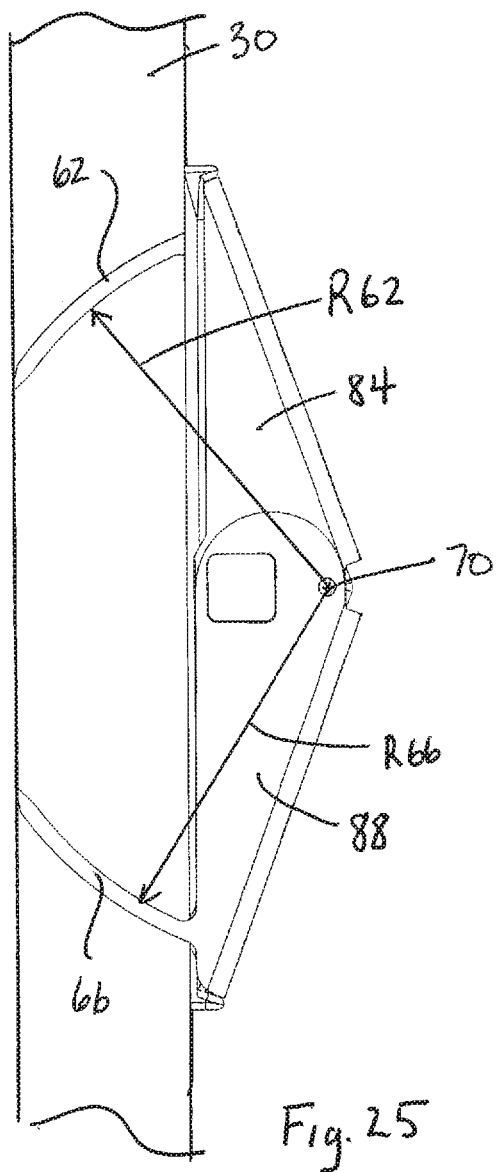

For the purpose of wall installation, while the anchor components 50, 52 are in their forward position the base member is held against the surface of the wall (per FIG. 24) and then the outer end of each anchor component is pressed toward the wall (per arrows 74 and 76) to rotate the retainers into the wall (per FIG. 25). The two anchor components may be pressed toward the wall in a staged operation (e.g., one at a time). This two stage method of retainer penetration results in an anchor with a suitable number of retainers to hold larger weights without requiring excessive force to move the retainers into the wall. The final install position results in a jaw-type gripping action of the anchor assembly into the wall. The gripping action supports high hanging loads and loads with a moment component, such as a shelf loads, towel bars, coatracks etc. that can be supported on the anchor assembly.

In the illustrated embodiment, each anchor component 50, 52 includes a primary plate element 80 and 82 (e.g., generally rectangular in shape) and lateral plate elements 84, 86 and 88, 90 (e.g., generally triangular in shape) extending from the primary plate element toward the wall facing side of the base member 12. Each curved wall penetrating retainer extends from a respective one of the lateral plate elements. The anchor components may thus be formed from a metal plate material, and be unitary or monolithic in construction. However, other variations are possible. The lateral plate elements of each anchor component extend at least partially over the lateral sides of the base member 12 when each anchor component is in the install position.

In the illustrated embodiment, the two anchor components 50 and 52 are of identical shape and size. The inner end 54 of anchor component 50 and the inner end 56 of anchor component 52 partially overlap, including in the region of the lateral plate elements. The inner end of the two anchor components are laterally offset from each other along the pivot axis to enable the overlap by having adjacent lateral plate elements of the two anchor components slide over each other or move in close proximity to each other as the anchor components are pivoted.

In some embodiments wall facing edges of the lateral plate elements may engage a rim portion of the base member, or may engage the wall, when the anchor components are in the install position. In the regard, in the illustrated embodiment the lateral side 18 of base member 12 includes a through opening 100 along a rim that passes to the wall facing side for retainer passage and a slot 102 for retainer passage. Likewise, the lateral side 20 of the base member 12 includes a through opening 104 along the rim that passes to the wall facing side for retainer passage and a slot 106 for retainer passage. The through openings are located toward opposite ends of the base member and the slots are located towards opposite ends of the base member, such that the through openings and the slots are diagonally offset from each other. These openings may be used to facilitate the incorporation of transition fillets from the anchor plate portions to the elongate retainer body. Embodiments in which the base member is sized to enable retainer passage without incorporation of through openings and/or slots are also contemplated.

The retainers of the illustrated embodiment have a primarily rectangular cross-section for cross-sections taken normal to a curved lengthwise axis of the retainer. In some implementations where the rectangular cross-section is non-square, a longer dimension of the cross-section of all retainers may all run in similar orientations (e.g., all generally parallel to the lengthwise axis 26 when the cross-section is taken near the point of departure from the plate portion of the anchor component, or all generally perpendicular to the lengthwise axis 26 when the cross-section is taken near the point of departure from the plate portion of the anchor component). In other implementations the orientation of the longer dimension may vary as between retainers on the same anchor component or as between retainers on one anchor component and retainers on the other anchor component.

The anchor assembly 10 can advantageously be used to mount various different components to a wall. In this regard, the illustrated base member 12 includes an opening 110 in lateral side 18 that extends toward the lateral side 20. The opening 110 may extend through the base member all the way to and through the second lateral side. Each lateral plate element includes a respective opening (e.g., per openings 112 and 114). The lateral plate elements at each lateral side of the base member overlap when the anchor components are in the install position, and the openings in the lateral plate elements align with each other and the base member opening 110.

Referring now to FIGS. 26-32, an exemplary floating shelf assembly configured for support by a pair of spaced apart anchor assemblies 10 is shown. The shelf 120 is of a floating shelf type which, when mounted, appears to project out of the wall surface, and has no visible wall supports. In this regard, the back side 122 of the shelf includes a recessed area 125 that is bounded on all sides, and that has spaced apart brackets 124 mounted therein (e.g., by screws passing through an upright plate portion 126). Alternatively, the bracket structure could, for example, be formed monolithically with the shelf (e.g., where the shelf is molded of plastic and the brackets molded of plastic) or, in another example, the shelf may be of molded plastic with brackets of metal insert molded with the shelf. For stability purposes an upper ledge portion 128 of each bracket may be in contact with the upper surface 130 of the recessed area. Each bracket includes a downwardly extending mount finger 132 that engages with a respective anchor assembly 10, as best seen in FIG. 30 where the wall in which the anchor assemblies 10 would be mounted is not shown. In this regard, for the purpose of the shelf mounting it is contemplated that each anchor assembly is mounted horizontally in the wall such that the curvature of the retainers extends horizontally rather than vertically. As shown in FIG. 30 where the base member of the anchor assembly is not shown, the downwardly extending bracket finger 132 extends through the aligned openings 112, 114 of the two anchor components, and likewise into the aligned base member opening (not shown), providing the vertical support needed for the shelf unit 120.

The illustrated openings 110, 112 and 114 are of rectangular configuration, and the bracket mount finger 132 that sits within the aligned openings for purpose of shelf mounting is oriented with a relatively narrow lateral width W132 as compared to the lateral width (e.g., W112) of the openings 110, 112, and 114. This configuration provides for suitable lateral tolerance in the position of the spaced apart shelf brackets 124 relative to the spaced apart anchor assemblies (e.g., the bracket mount fingers need not be perfectly centered on the anchor assembly openings to engage the shelf onto the wall mounted anchor assemblies). However, in other embodiments the shelf bracket fingers and anchor assemblies could be cooperatively configured to provide for a tighter lateral fit if desired.

As seen in FIG. 32, the bracket fingers 132 may have a depthwise dimension that increases when moving upward from the bottom of the finger 132. In one arrangement the plane in which the forward edge 136 of the finger lies is angularly offset from the plane in which the rear edge 134 of the finger lies (e.g., by an angle Θ1 in the range of between about 1 and 4 degrees, such as about 2 to 3 degrees). Here the plane of rear edge 134 is parallel configured to be parallel with the wall surface upon mount. Thus, the forward edge 134 is angularly offset from the wall surface during install, and the interaction between the forward edge of the finger 132 and the forward edge of any one or more of the aligned openings of the anchor assembly as the finger 132 moves farther down into the openings may operate to pull the rear side of the shelf unit 120 toward the wall so as to be flush with the wall. In this regard, in order to reduce or eliminate downward sag of the shelf as it protrudes off the wall (particularly the upper shelf surface), the rear edges of the shelf may lie in a plane that is slightly offset from vertical, similar to as described above for shelf unit 751. In such cases, during the shelf mount process, as the shelf is moved downward onto the anchor assemblies, the combination of the finger engagement with the aligned anchor assembly openings and the angled orientation of the rear shelf rear edges will tend to cause the upper end of the shelf to pivot about the lower end of the shelf toward the wall.

While the use of two brackets and two anchor assemblies is shown, it is recognized that in some implementations a shelf may be mounted on a single anchor assembly, and in other implementations three or more spaced apart anchor assemblies may be used. Likewise, the configuration of the inter-engaging structure as between the shelf and the anchor assembly could vary widely. For example, while rectangular aligned openings 110, 112 and 114 are shown, the shape of the openings could vary, as could the shape of the fingers. In addition, the anchor assembly could include a finger or other upward projection and the shelf brackets an opening or cavity to receive such projection. One or both of the brackets could be loosely mounted to the shelf to permit some lateral play of the bracket to facilitate alignment with the engaging feature on the anchor assembly.

Figure 52:
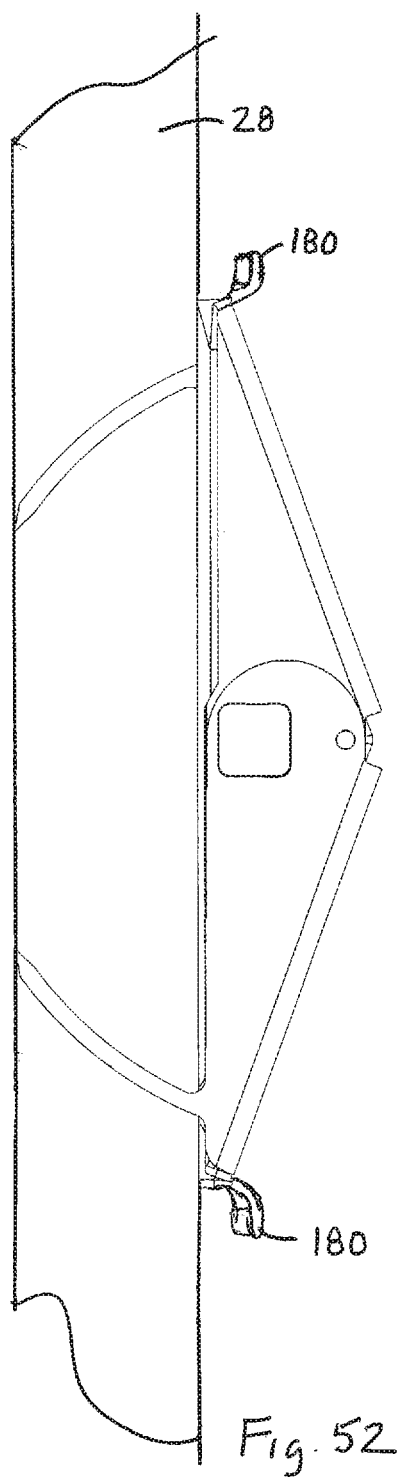
FIGS. 52-53 show another embodiment of an anchor assembly.
Figure 53:
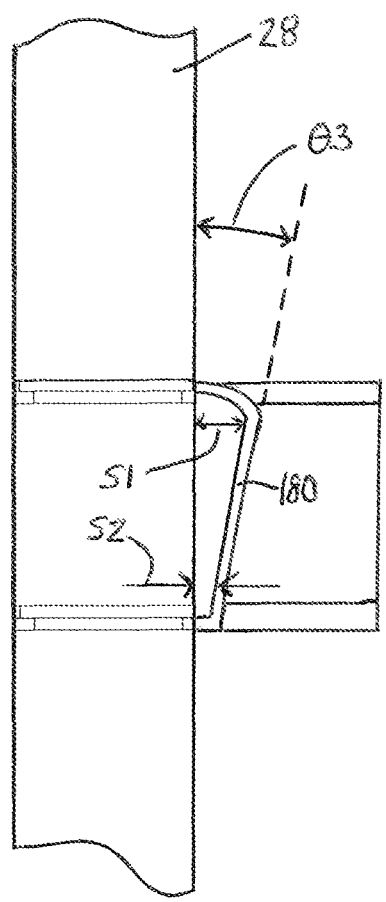

As another variation, the base member could also be formed with side flanges 180 that are offset from the wall 30 per FIGS. 52 and 53. This flange position and orientation may be readily achieved by molding or casting, but could also be achieved by suitable bends in a plate structure. As best seen in FIG. 53, the flanges 180 are angled slightly rearward when moving in a vertically downward direction (represented by acute non-zero angle Θ3) such that a spacing S1 of the upper end of the flanges 180 to the back part of the base member that abuts the wall after install is greater than a spacing S2 of the lower end of the flanges to the back part of the of the base member that abuts the wall after install. These flanges may be used to mount a separate component, such as a hook, floating shelf or other structure onto the anchor assembly in a manner such that, if a lock in the pivot or hinge axis is provided, corresponding flanges on the component interact with the flanges 180 to pull the component toward the wall 30.

Figure 21:
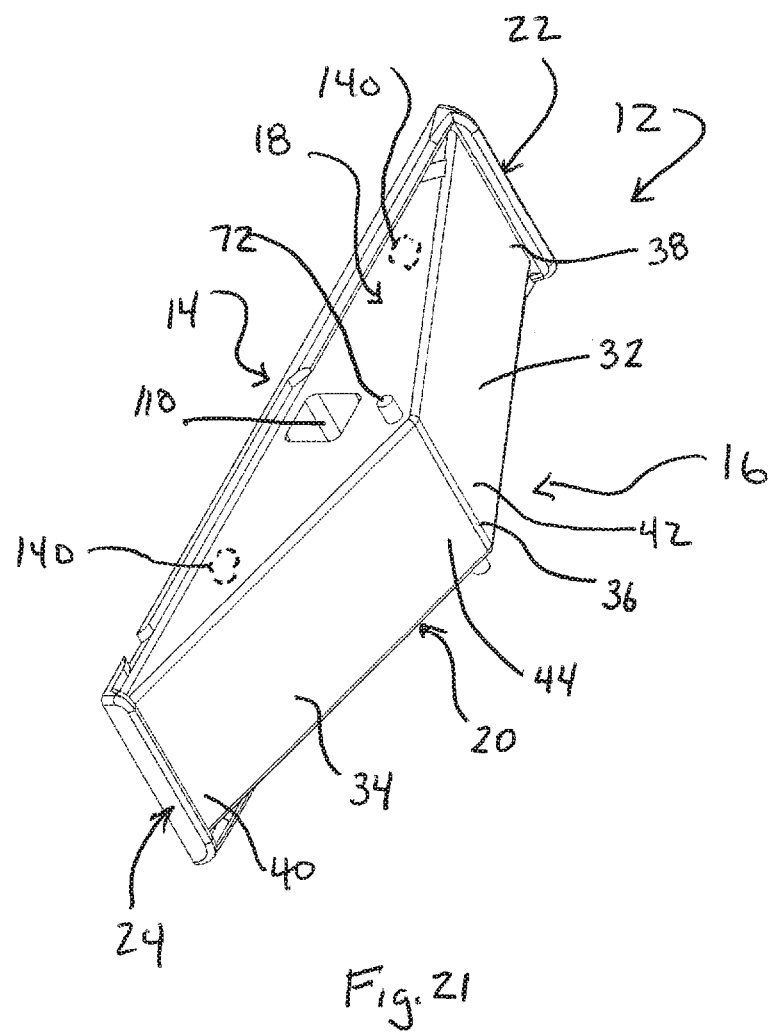
Figure 22:
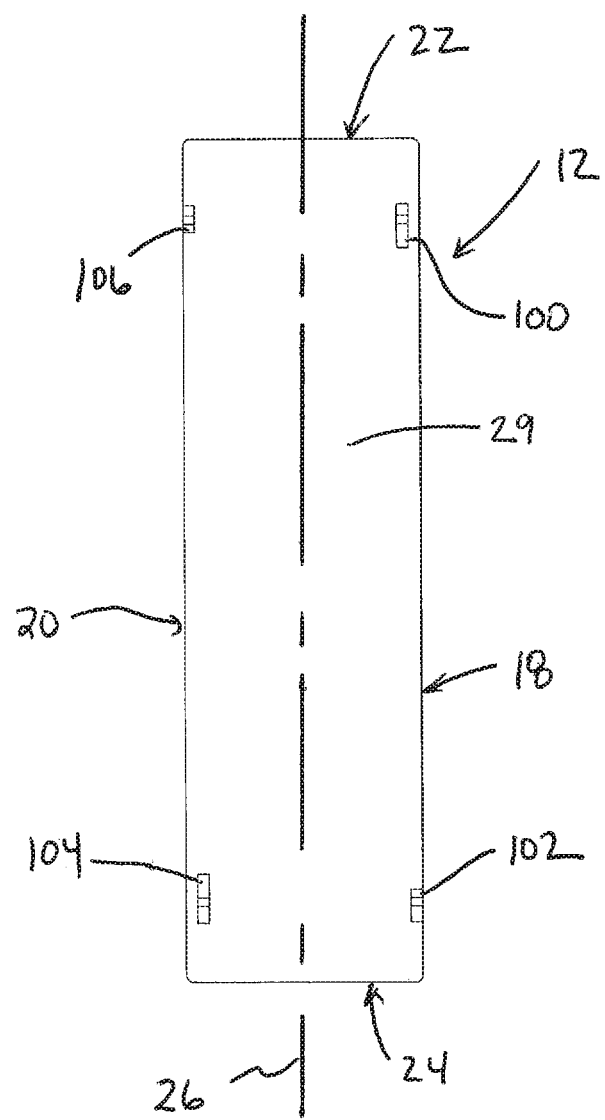
Figure 23:
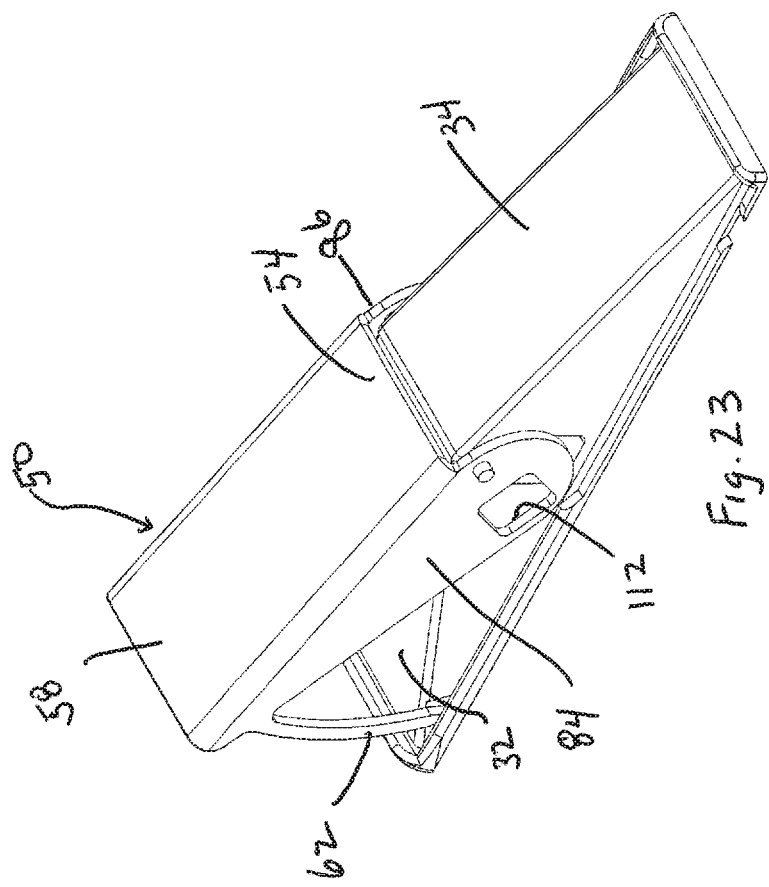
Figure 24:
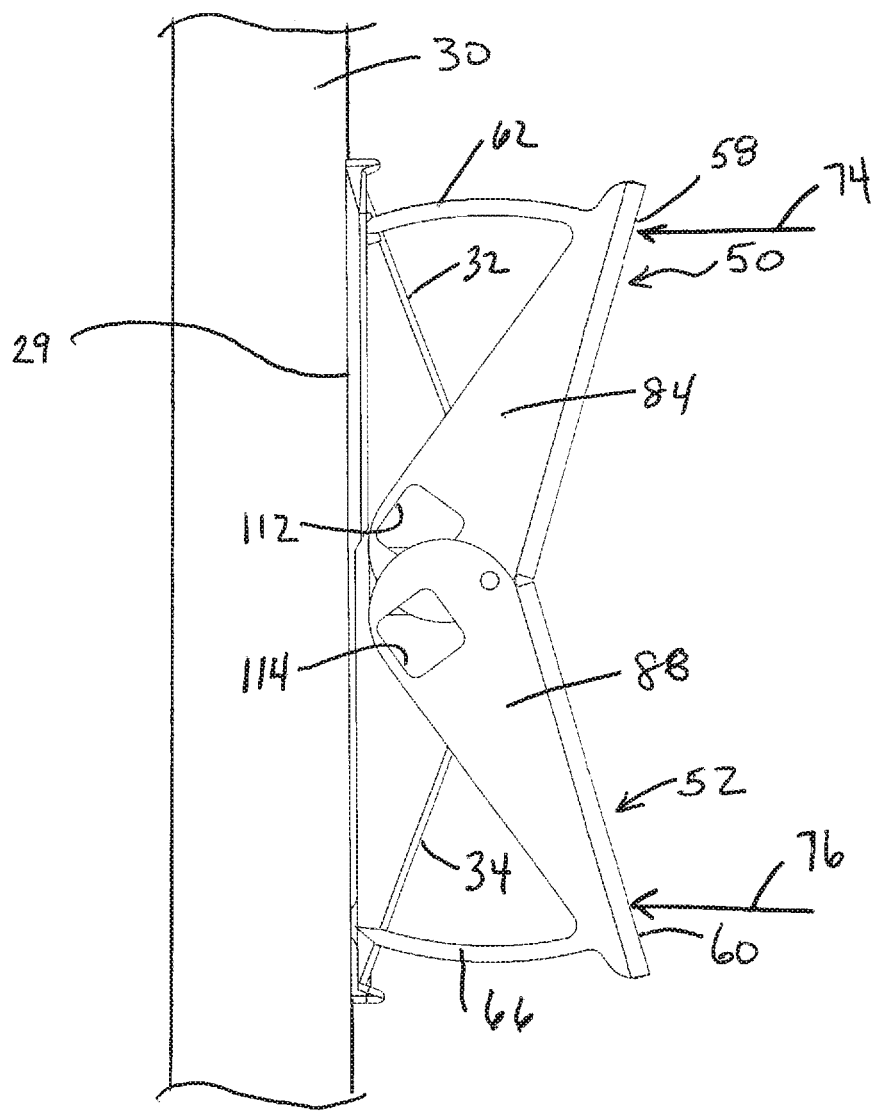
Figure 51:
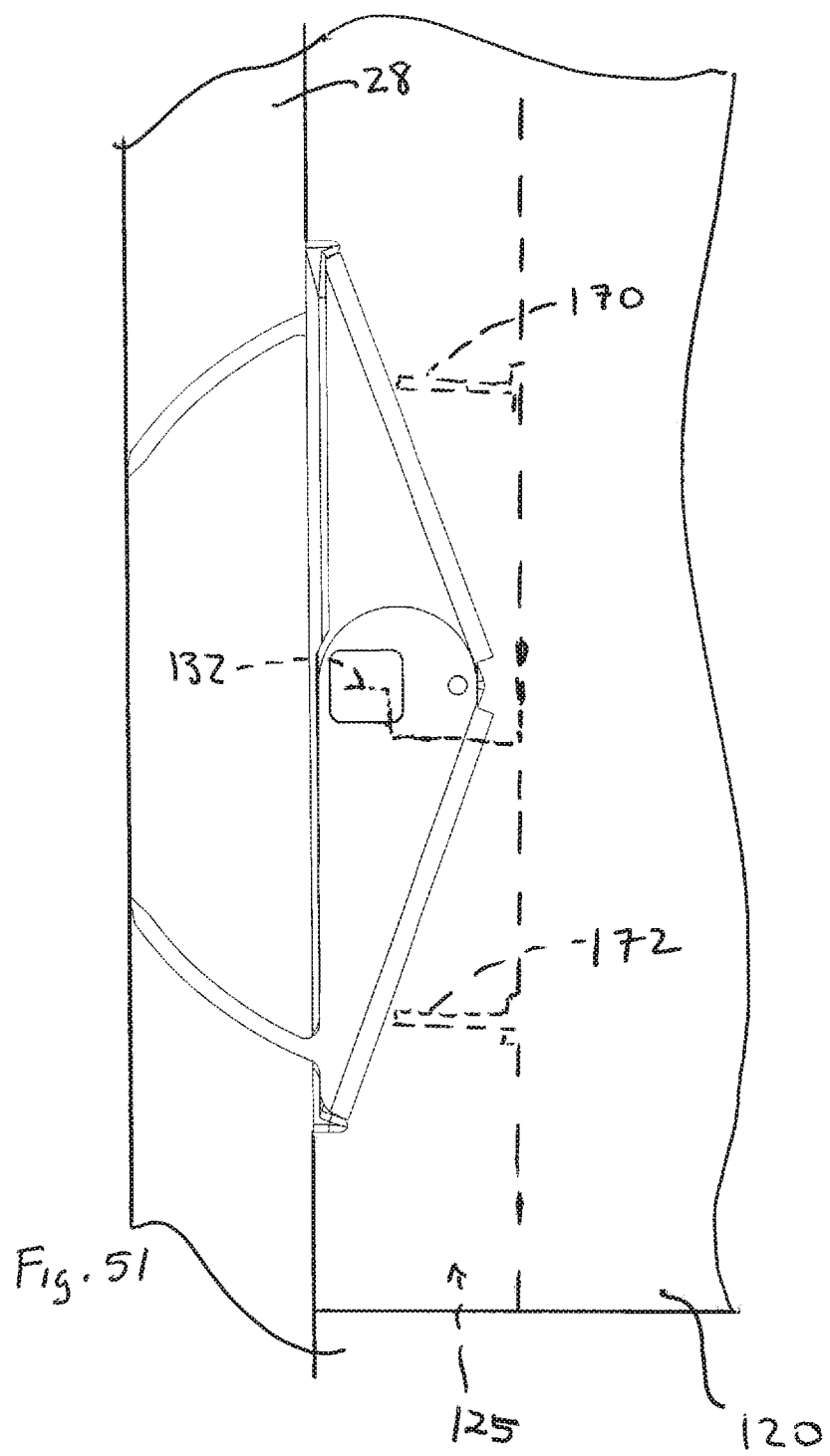
FIG. 51 shows a partial view of another anchor assembly with shelf unit.

More than one opening in the base member could be provided for engagement with a shelf finger as suggested by the spaced apart openings 140 of FIG. 21 shown in dashed line form, and in such cases the anchor components would include openings to align with openings 140. Having the two shelf fingers engage the openings 140 aids by inhibiting rotation of the anchor assembly relative to the shelf (e.g., about a vertical axis when the anchor assembly is installed horizontally as described above). However, other mechanisms could be used to prevent such relative rotation of the anchor assembly. For example, as shown schematically in FIG. 51, where partial top plan view a mounted shelf unit 120 is shown, and shelf components within the recess 125 at the back of the shelf are shown in dashed line form, in addition to the mounting bracket with finger 132, space apart bracket elements or other structures 170, 172 could be located to engage with the anchor components in a manner to prevent or inhibit such relative rotation of the anchor assembly when the shelf unit undergoes loading.

Figure 20:
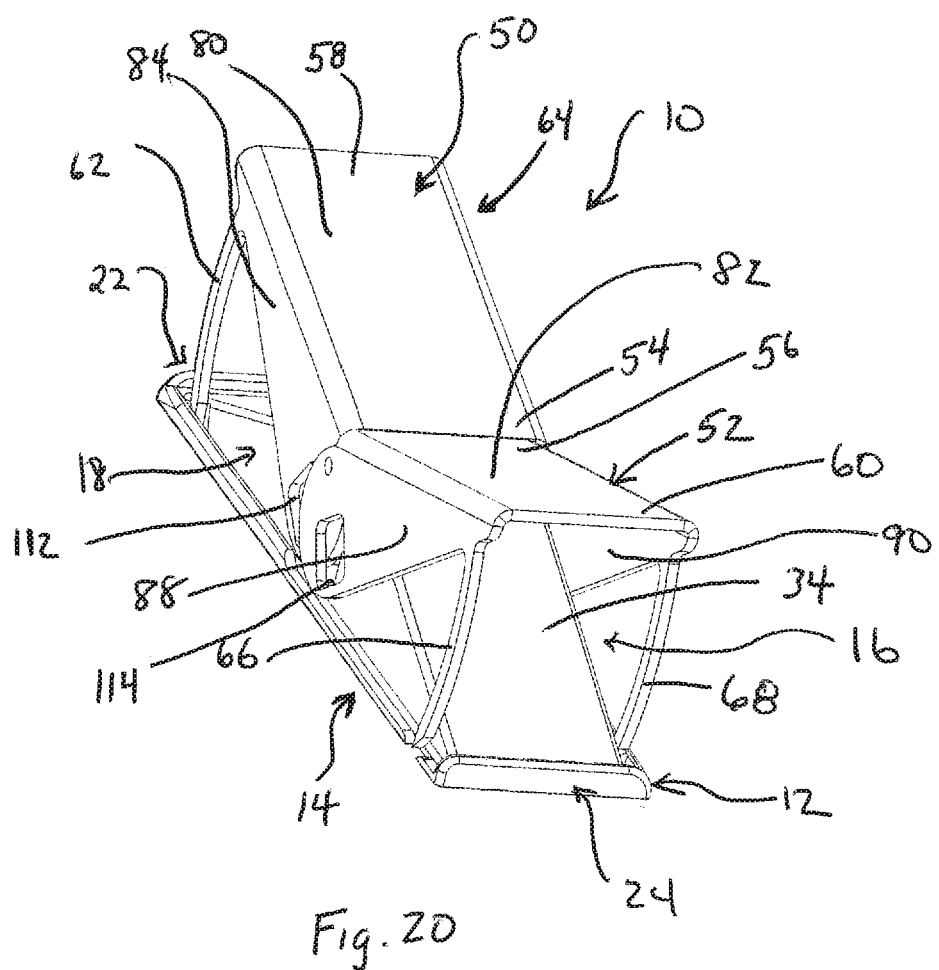
FIGS. 20-25 show another embodiment of an anchor assembly.

Referring now to FIGS. 33-39 another embodiment of an anchor assembly 210 is shown (where like numerals show portions similar to the embodiment of FIG. 20 above). The anchor assembly includes anchor components 50 and 52 of similar shape and configuration to the anchor components of anchor assembly 10 shown and described above and therefore like reference numbers are utilized for the various portions of the anchor components and the pivot or hinge pin 72 the connects the anchor components to the base member 212. The anchor assembly utilizes a base member 212 including a wall facing side 214, outer side 216, lateral sides 218 and 220 and opposite ends 222 and 224. Lateral sides 218 and 220 extend from the wall facing side 214 to the outer side 216. The ends 222 and 224 are distal portions in a lengthwise (longer) direction or axis of the base member. In this embodiment it is contemplated that the base member 212 is formed of a bent metal plate structure (or die cast metal structure), although in some cases some or all of the base member 212 could be of plastic or other polymer.

Figure 35:
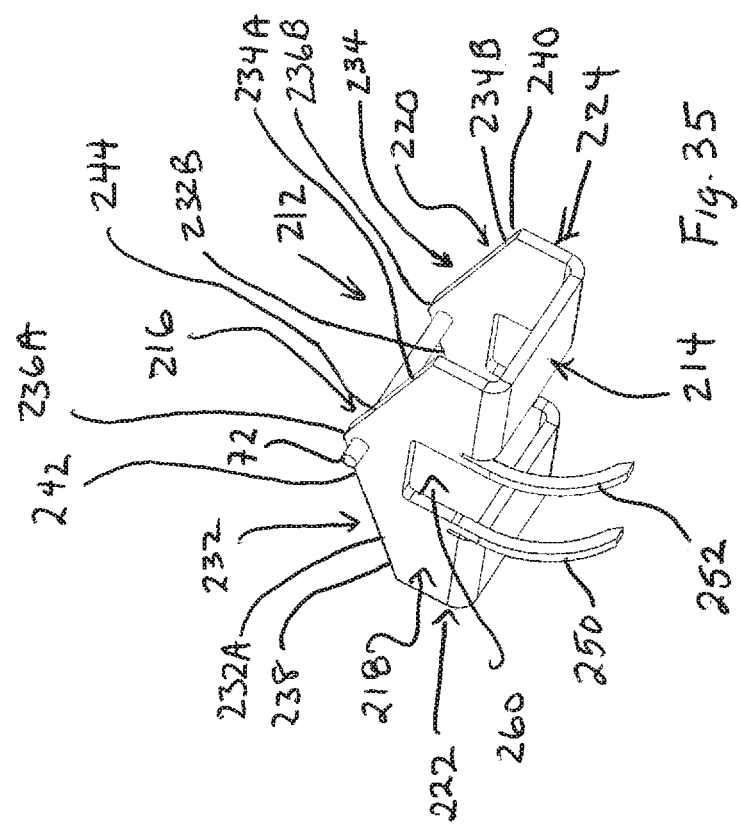

As best seen in FIGS. 33 and 35, the wall facing side 214 includes a base surface 230 for seating against a wall 30, in this case comprised of two discrete planar surfaces 230A and 230B. The outer side 216 of the base member includes anchor support surfaces 232 and 234 that are angled relative to each other, with such surfaces comprised of edges 232A, 232b and edges 234A, 234B respectively. In the illustrated embodiment the surfaces 232 and 234 converge toward each other as they move from respective ends 222 and 224 toward a mid-section of the base member, converging at apex regions 236A and 236B. Both anchor support surfaces 232, 234 are nonparallel with the base surface 230, with the outer end 238, 240 of each anchor support surface positioned closer to the base surface 230 than the inner end 242, 244 of the anchor support surface.

Figure 36:
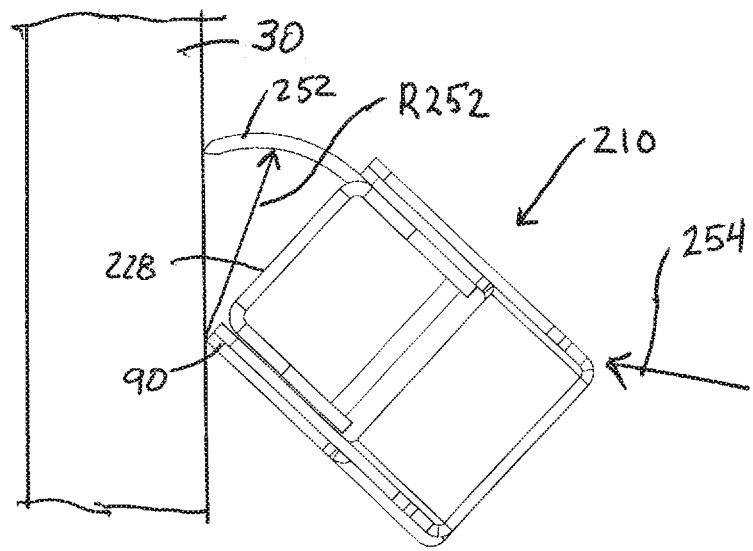
Figure 37:
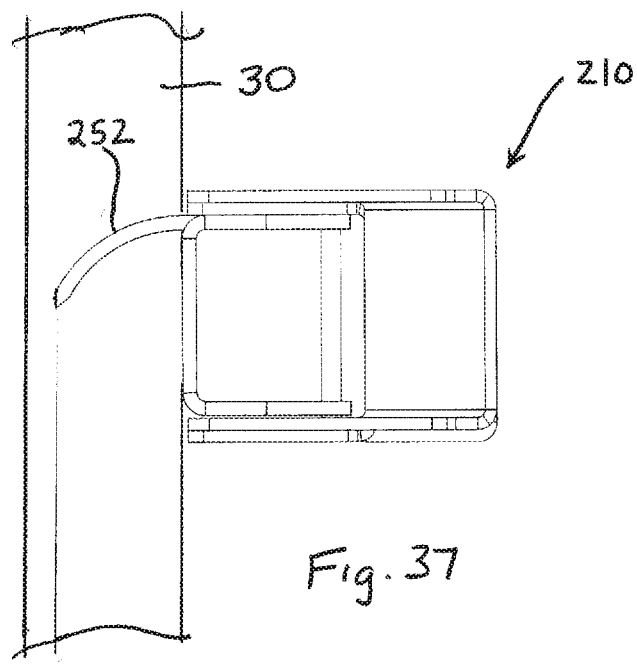
Figure 38:
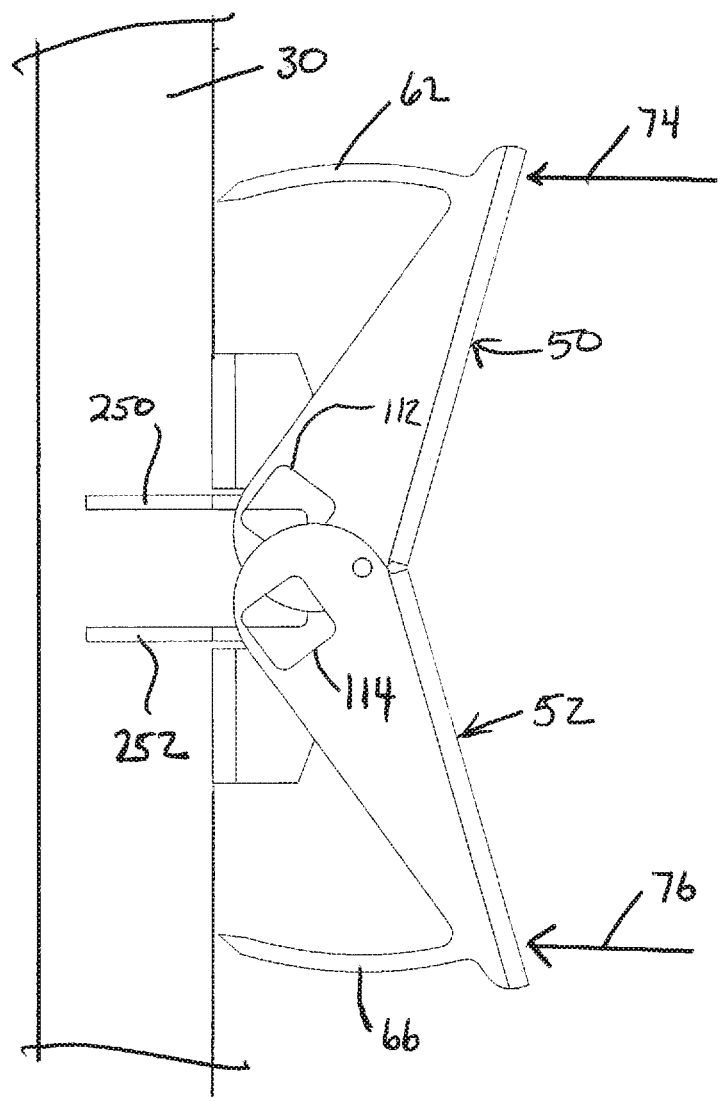
Figure 39:
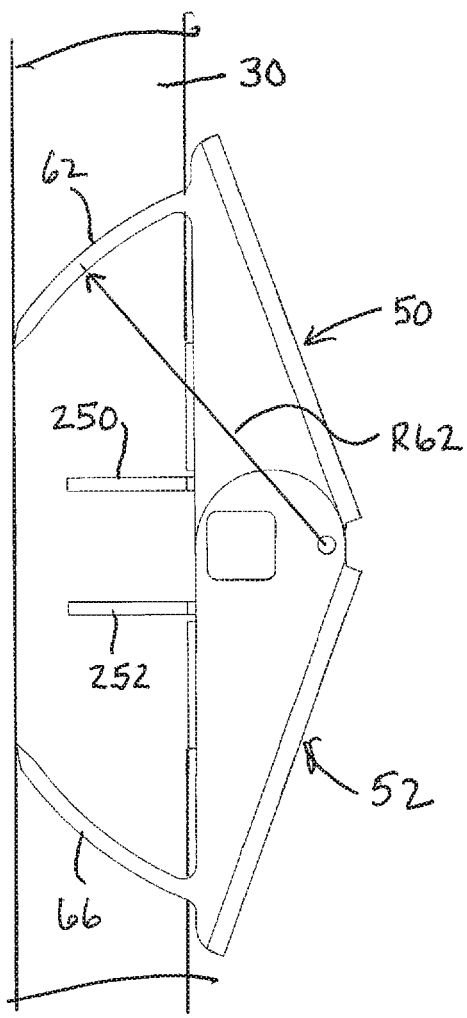

Notably, the lateral side 218 of the base member 212 includes a set of curved wall penetrating retainers 250 and 252. The base member retainers 250, 252 curve in a direction that is substantially perpendicular to the curvature direction of the anchor retainers. Referring to FIG. 36, for the purpose of wall installation, while the anchor components 50, 52 are in their forward position the base member 212 is held against the surface of the wall in angled manner and then pressure applied (e.g., per arrow 254) to rotated the lateral side 218, which is shown as the upper lateral side, toward the wall and move the retainers 250, 252 into the wall. In this case, the radius of curvature of the base retainers (e.g., R252) may be at the lower corner or edge of the wall facing base surface 228 or at the edge of the lateral plate element 90 for most efficient and effective rotational install. Similar to FIGS. 24 and 25 above, each anchor component is then pressed toward the wall (per arrows 74 and 76 of FIG. 38) to rotate the anchor retainers into the wall (per FIG. 39). The two anchor components may be pressed toward the wall in a staged operation (e.g., one at a time). Again, this two stage method of retainer penetration results in an anchor with a suitable number of retainers to hold larger weights without requiring excessive force to move the retainers into the wall. The final install position results in a jaw-type gripping action of the anchor assembly into the wall. Moreover, other advantages are achieved by incorporating the downwardly curved retainers 250, 252 on the base member 212, such as increasing the vertical retention force and increasing the normal retention force. Alternatively, the retainers could curve upward within the wall.

In the anchor assembly 210 the aligned openings 112, 114 of the anchors may be used to engage with retaining fingers or other structure on shelves or other components to be mounted in a similar manner as described above with respect to FIGS. 26-32. Notably, as best seen in FIG. 35, the base member 212 includes an opening 260 in lateral side 218, which opening aligns with openings 112 and 114 when the anchor assembly is installed. Unlike opening 110 in base member 12 of FIG. 21, opening 260 is not closed at the wall facing side. It is recognized that, depending upon the relative size/position of the various openings 112, 114 and 260, a shelf finger (e.g., per finger 132) could interact with any of the openings to pull the rear side of the shelf unit 120 toward the wall as the shelf unit is mounted to the anchor assembly.

Figure 40:
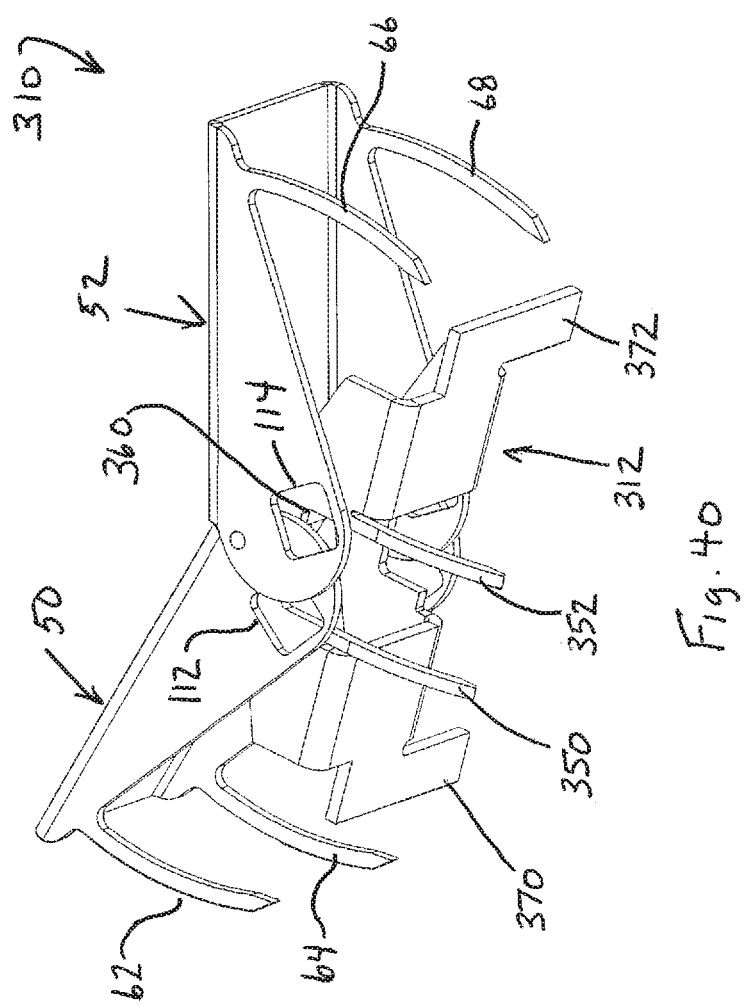
FIGS. 40-42 show another embodiment of an anchor assembly.
Figure 41:
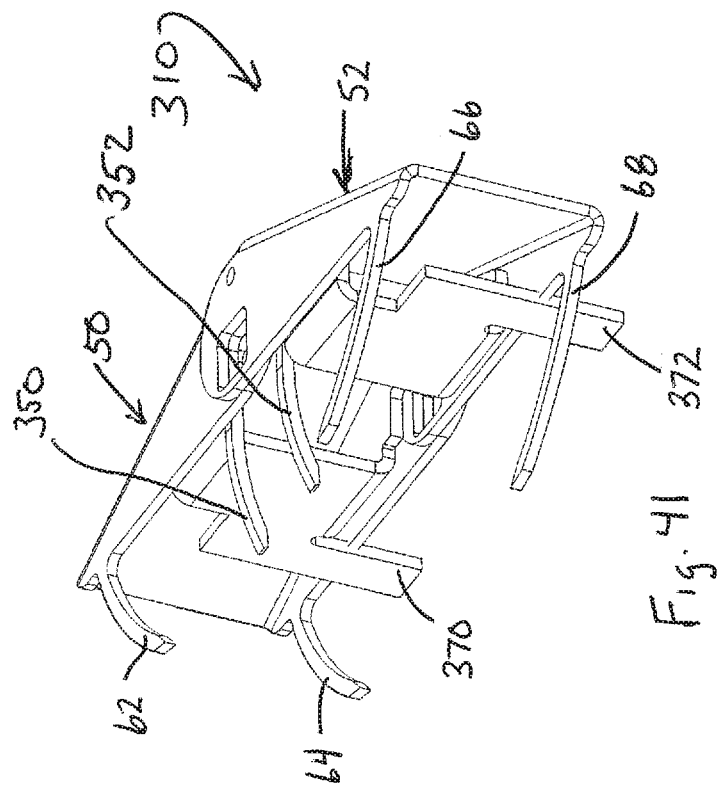
Figure 42:
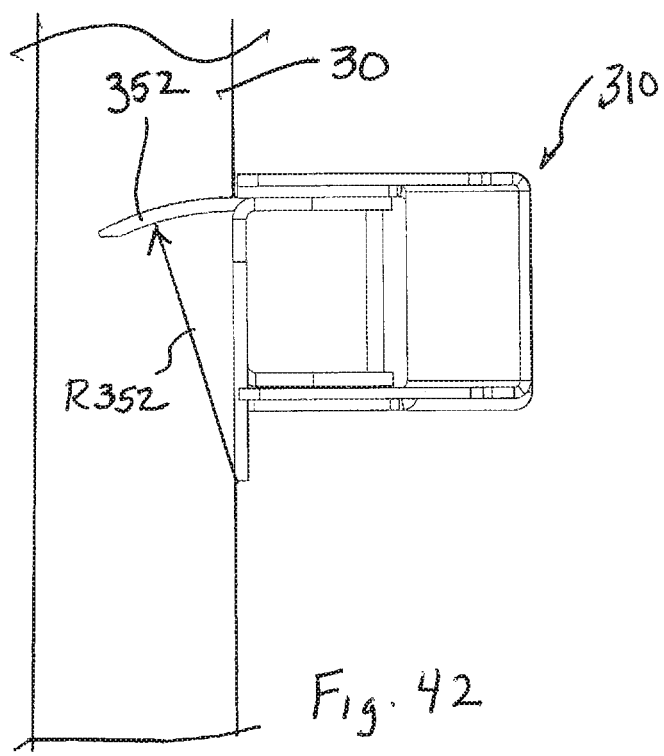
Figure 47:
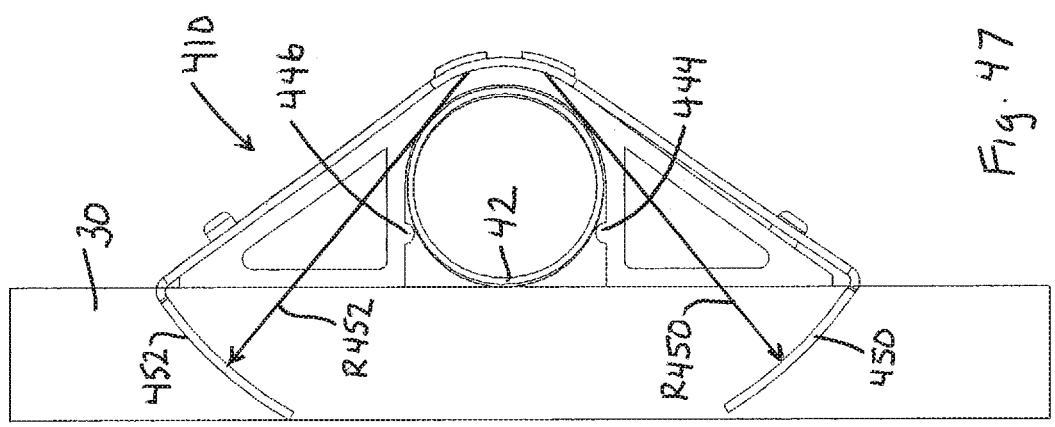

Referring to FIGS. 40-42, a third embodiment of an anchor assembly 310 is shown, which also incorporates anchor components 50 and 52 similar to anchor assemblies 10 and 210 and therefore includes some similar numbering of portions. The base member 312 of anchor assembly 310 is similar to the base member 212, and base member 312 functions in much the same way. However, in the case of base member 312 base surface extensions 370 and 372 have been incorporated. These extensions 370, 372 provide a lower pivot point for initial rotation of the base member 312 into the wall, and thus the radius of curvature of the base retainers 350 and 352 (e.g., per R352 in FIG. 42) is larger than that of retainers 250 and 252 (all else being equal), which makes it easier to install base member. Moreover, providing more height between the base retainers and the lower edge of the anchor component improves overall performance of the anchor assembly by increasing the ability of the anchor assembly to withstand more moment load, such as from a shelf that may be mounted on the anchor assembly.

While the anchor assemblies described above all include two distinct anchor components on a base member, other variations are possible. For example, referring to the anchor assembly 410 of FIGS. 43-47, the base member 412 includes anchor components 420 and 422 that are formed as a unitary piece 424 (e.g., of metal plate material). The metal plate can be bent for purposes of installation so as to effectively wrap the piece over the base member anchor support surfaces. The pivot end of each anchor component 420, 422 is thus located in a central portion along the length of the piece 424. In the illustrated embodiment the central portion of piece 242 includes a pair of openings 426 and 428 and the outer side of the base member includes projections 430 and 432 configured to interact with those opening to help assure proper positioning of the anchor components 420 and 422 on the base. Moreover, further openings 434 and 436 may be located toward the retainer ends of the anchor components for alignment and positioning over protruding buttons 438 and 440 on the outer side of the base member. In such an embodiment the center of the radius of curvature of the anchor retainers (e.g., retainers 450, 452) may be near the central portion of the piece 424 (e.g., per R450 and R452). In some case the centers may be coincident and in the very middle of the central portion.

As mentioned above, the anchor assemblies of the present application can be used to mount a variety of components to walls. In the case of anchor assembly 410, the base member 412 is configured with a lateral side to lateral side through opening 441 that is sized and configured to mount a tubular member 442, such as electrical conduit, water pipe or wire form structure, to the wall 30. In this case the tubular member is round, but other shape tubes could be accommodated as well. In this regard, the illustrated opening 441 includes opposed ribs 444, 446 that extend along the opening, were a distance DR between the ribs is sized to enable the base member to be releasably clipped over a tubular member so that the ribs hold the base member onto the tube, but allow for rotation of the base member relative to, and sliding movement of the base member along the tube 442, so as to attain the desired position for the anchor assembly before the anchor retainers are pressed into the wall.

In some cases, it may be possible to eliminate the base member of an anchor assembly. For example, referring to the anchor assembly 510 of FIGS. 48 and 49, the base member is eliminated and a unitary elongate plate member 514 with anchor components 516 and 518 interconnected by a central tubular portion 524 is provided. The tubular portion 524 may define an opening that includes inwardly extending ribs or tabs 526 and 528 shaped and configured to enable the anchor assembly to be clipped onto a tubular member 530. Each anchor component may be in a forward position (e.g., represented by anchor component position 516' in FIG. 49) when the anchor assembly is initially clipped to the tubular member 530. Once the anchor assembly is in the desired position along the tubular member, each anchor component may be pressed toward the wall to rotate the anchor retainers into the wall. Such manipulation of the anchor component for wall attachment necessarily involves some bending of the plate member of the illustrated embodiment, particularly along locations 532 and 534 where the anchor components join the tubular portion 524. In this case the radius of curvature of the anchor retainers (e.g., 540 and 542) may be substantially centered at the primary bend location (e.g., as represented by R542). In an arrangement such as that depicted in FIGS. 48 and 49, it may be said that the tubular member itself acts as the base for the anchor assembly 510.

Referring now to FIGS. 50A and 50B, another embodiment of an anchor assembly 610 including a base member 612 and separate anchor components 650, 652 is shown. In the illustrated anchor assembly, each anchor component 650 and 652 is independently associated with the base member 612 in that the anchor components do not overlap and do not share a common hinge pin. Instead, the central portion of the base member includes a pivot base 614 having a laterally extending slot 616, 618 on each side for receiving the pivot end of the respective anchor component 650, 652. In this embodiment the anchor components 650, 652 may be retained against the base member by the slots once the anchor components are moved to the install position, but may otherwise be removable. As another possibility, the pivot ends of the anchor components and the respective slots may include mating features (e.g., a hook and tab arrangement) to retain the anchor components on the base member. The radius of curvature of the anchor retainers (e.g., 662 and 666) may be substantially centered in the respective slot 616 or 618 (e.g., as represented by R662). In one example, the opening 670 in the base could, for example, be sized to fit over a wire form member, such as a wire form extending along the back edge of a wire form shelf, thereby enabling direct mounting of a wire form shelf to a wall.

One common and beneficial feature of each of the foregoing anchor embodiments is that the center of the radius of curvature of the anchor retainers of both anchor components, also the pivot point of both anchor components, is offset from the wall surface and, in embodiments that include a base member, the base surface. This offset increases the angle of attack of the retainer into the wall. The angle of attack of a given retainer can be defined as the angle between a line or plane running from the point of retainer entry into the wall to the pivot axis about which the retainer moves and a line or plane normal to the wall surface. Referring to FIGS. 55A-55D, various anchor assembly configurations are shown with anchor components in installed positions within the wall. The anchor assemblies include respective points of retainer entry 800A-800D, respective retainers 802A-802D, respective pivot axes 804A-804D, respective normal lines 806A-806D and respective angles of attack αA-αD for one anchor component 808A-808D of the illustrated anchor assembly 810A-810D. It is recognized that the other anchor component of each anchor assembly includes a similarly defined angle of attack.

As suggested by the schematic depictions, as the pivot point of an anchor retainer moves outward away from the wall surface, the angle of attack increases and the amount of wall material encompassed by the retainer to resist pull-out of the retainer perpendicular to the wall surface (as represented by triangular areas 812A-812D) increases. Likewise, the anchor retention capability under cantilever loads (such as from a shelf supported on the anchor assembly) also increase. The most critical feature regard to these advantages is the increase in the linear extent to which the curved retainer lies behind the wallboard surface, as reflected in each case by line 814A-814D (e.g., basically the linear projection of the retainer in the wall surface plane). In the illustrated case, retainer 802A is shorter than retainer 802B, which in turn is shorter than retainer 802C, which in turn is shorter than retainer 802D, with all retainers approaching, but not passing through the backside of the wallboard, as is preferred. However, even in the case where the retainers 802B-802D were all the same length as retainer 802A, the retainers 802B-802D would progressively encompass more wallboard material.

Generally, it has been discovered that although more wall material can be encompassed by the retainers using a more aggressive angle of retainer attack, the force required for anchor component insertion also increases. It has been determined that a desirable range for balancing these two characteristics is to provide an angle of attack in the range of between about fifty-five degrees and about eighty degrees, such as about sixty degrees to about seventy-five degrees. However, other variations in the angle of attack are contemplated.

Figure 54C:
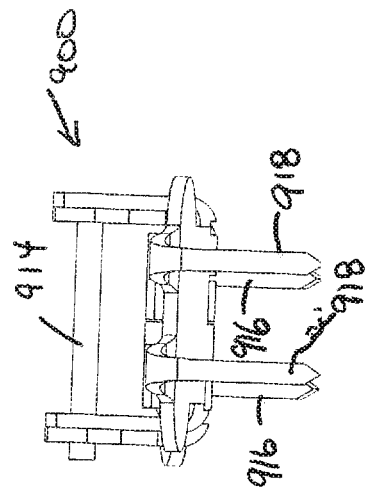
Figure 54B:
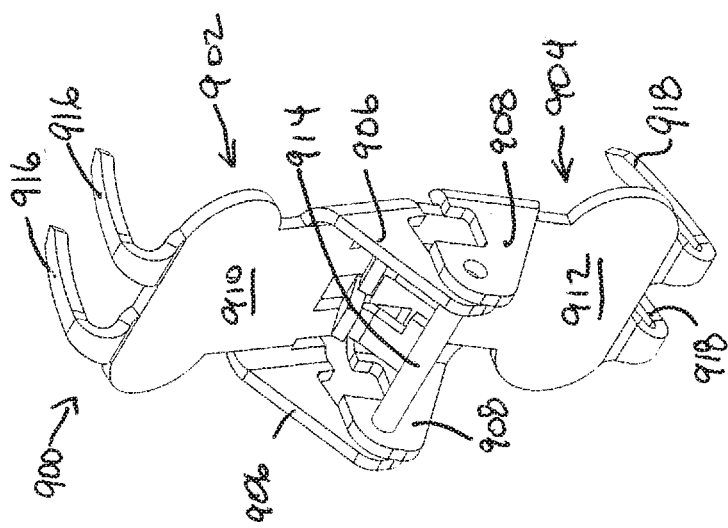
Figure 54A:
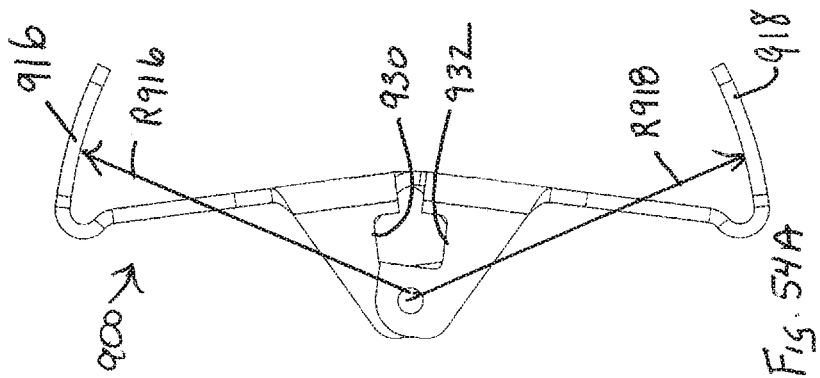
Figure 55D:
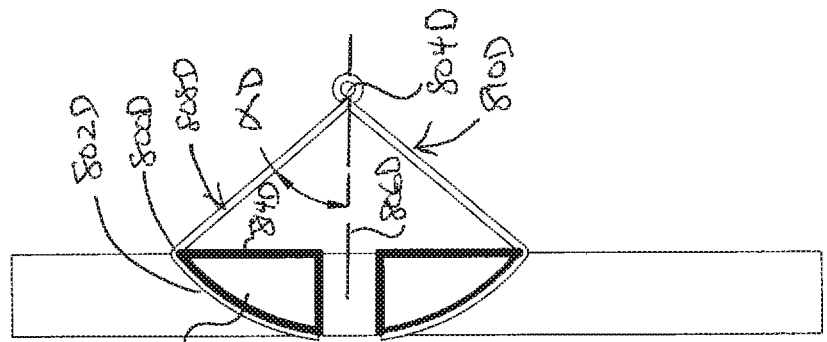
FIGS. 55A-55D schematically depict various anchor assembly arrangements with retainers having differing angles of attack.
Figure 55C:
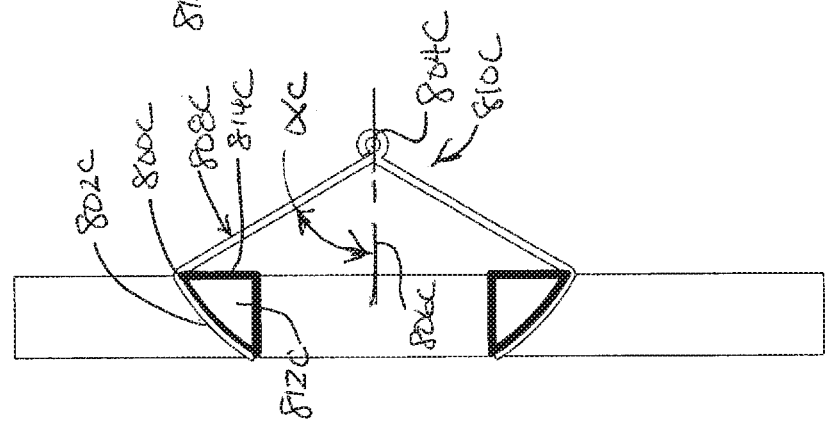
Figure 55B:
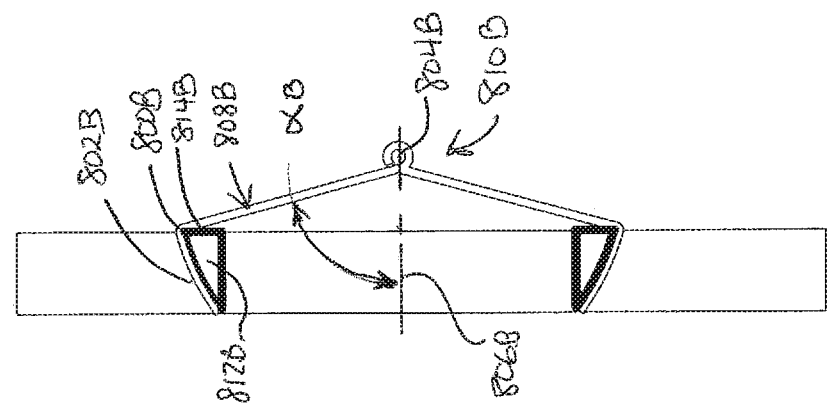
Figure 55A:
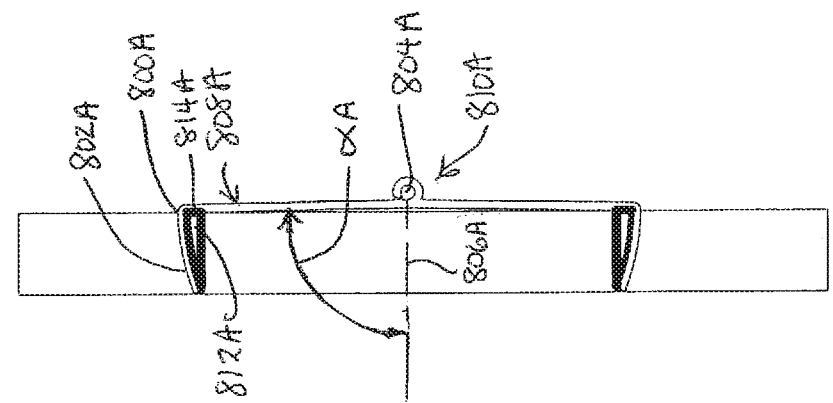

Notably, this angle of attack advantage can be achieved in both anchor assembly embodiments including a base member and anchor assembly embodiments that do not include a base member. In this regard, FIGS. 54A-54C depict another anchor assembly 900 that does not make use of a base. Instead, each anchor 902, 904 includes respective side plates or wings 906, 908 that extend from the sides of the base plate 910, 912. The wings are interconnected by a hinge pin 914 such that the two anchor components pivot around the hinge pin. The respective anchor retainers 916, 918 have a radius center of curvature R916, R918 substantially aligned with the hinge pin axis. Notably, the wings include respective edge configurations 930, 932 such that, when the anchor assembly is in the full install position the edge configurations will together form an opening that can receive a mount structure of a component to be mounted to a wall (e.g., such as shelf mount finger 132 described above). One benefit of the anchor assembly 900 is that, upon install of the anchor into a wall, the distance that the anchor protrudes from the wall is relatively small in all locations except the midsection where the wings and hinge pin are located.

As best seen in FIGS. 54D and 54E, where a single anchor component of the assembly is shown, the pivot end of each anchor component also includes a set of stabilizing legs 920, 922 having tips that curve outward away from the wall facing side of the anchor assembly. The stabilizing legs 920, 922 may be included to provide some support of the anchor assembly when it is placed against a wall and during rotation of the anchor components to achieve the install position with retainers engaged in the wall. Arcuate portions 924, 926 of the legs allow the legs to more readily slide relative to the wall during anchor component installation.

Figure 56B:
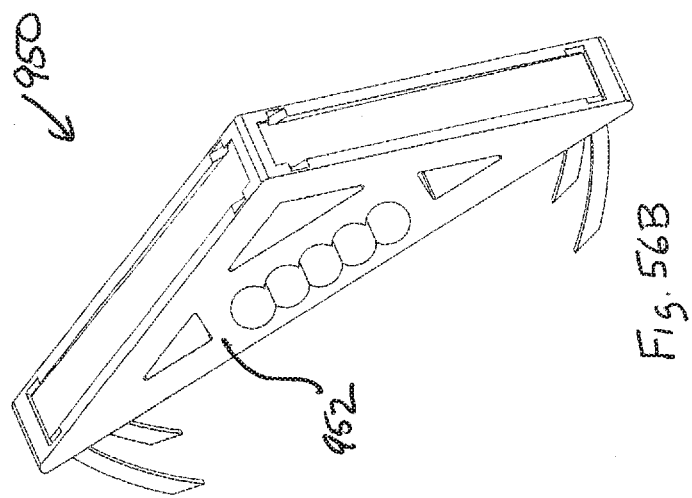
FIGS. 56A-56B show another embodiment of an anchor assembly.
Figure 56A:
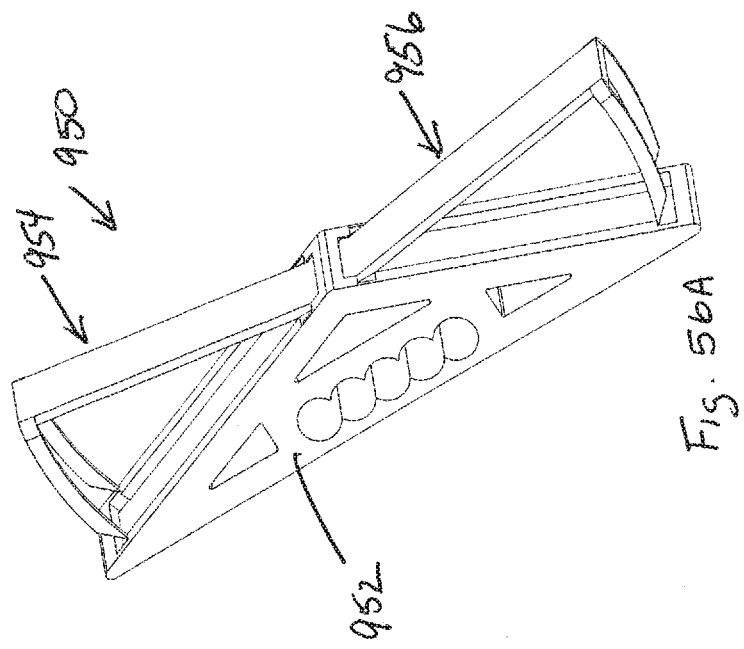

FIGS. 56A and 56B depict yet another variation of an anchor assembly 950 that includes a base member 952 and two anchor components 954, 956 pivotably associated with the base member.

In any of the foregoing anchor assembly embodiments, the wall penetrating retainers can also be configured with other advantageous features.

For example, to facilitate manual wallboard penetration and passage without tools, utilizing thumb or palm force only, the wallboard penetrating retainers may be formed with a relatively smooth external surface finish (e.g., achieved by polishing, painting, plating or other coating). In this regard, the surface of the wallboard penetrating retainers can be manufactured with or modified to a maximum average surface roughness of about 20 μinch (e.g., in some cases a maximum average surface roughness of about 15 μinch). In one implementation, just the end portion of the wallboard penetrating retainers are worked, processed or otherwise formed to achieve this desired low surface roughness feature in order to reduce manufacturing cost. The latter implementation would reduce install force but maintain friction on the rougher portions of the penetrating retainer to resist removal forces. The retainers may have a polished surface finish and/or a plated surface finish and/or a painted finish and/or a lubricant (e.g., Teflon) incorporated into the surface finish.

The wallboard penetrating retainers may also be configured such that the distal end of each wallboard penetrating retainer is shaped to provide a point. Proper sizing of the wallboard penetrating retainer(s) can also be used to achieve more user friendly performance of an anchor. In particular, in some implementations when the anchor assembly is installed at the front surface of the wallboard, the distal ends of the wallboard penetrating retainers may be positioned proximate to the rear surface of the wall without penetrating the paper layer at the rear surface. The cross-sectional sized of the retainers can be selected as suitable for manual installation.

The anchor assemblies can generally be installed without the use of tools (e.g., by user thumb force to rotate the anchor component) and provide a very beneficial load support capability once installed. Moreover, upon removal of the anchor from the wall the size of the hole(s) that are left for repair will be small, which (i) makes it simpler for the novice homeowner to make a clean wall repair with as little as just paint fill and (ii) more readily allows for slight repositioning of the anchor (e.g., in close proximity to the existing holes) if needed.

It is to be clearly understood that the above description is intended by way of illustration and example only, is not intended to be taken by way of limitation, and that other changes and modifications are possible. For example, the anchor components could be formed with snap in place retainers (e.g., wire form retainers that snap into place on metal or plastic plate) or the anchor components could be produced using an overmold process (e.g., an overmold to connect retainers to a plastic plate or an overmold of the metal plate and retainer combination).

What is claimed is:

1. An anchor component, comprising:
a base including a front side, a back side, a first side, a second side, a pivot end and a retainer end, the retainer end opposite the pivot end, the first side and the second side running between the retainer end and the pivot end, the second side opposite the first side;
at least first and second wall penetrating retainers located toward the retainer end and spaced apart from each other with the first wall penetrating retainer at the first side and the second wall penetrating retainer at the second side, the first wall penetrating retainer including a first wall penetrating extent that protrudes rearwardly of the back side of the base and has a curved configuration, the second wall penetrating retainer including a second wall penetrating extent that protrudes rearwardly of the back side of the base and has a curved configuration, wherein the curved configuration of the first wall penetrating extent curves toward the pivot end, wherein the curved configuration of the second wall penetrating extent curves toward the pivot end;
wherein the base, the first wall penetrating retainer and the second wall penetrating retainer are of monolithic configuration formed of a plate material that defines a plate thickness, wherein the plate material is bent so as to position the first and second wall penetrating retainers such that the first wall penetrating extent and the second wall penetrating extent protrude rearwardly, with the plate thickness, along the first wall penetrating extent and the second wall penetrating extent, running in a direction that extends from the first side toward the second side;
wherein the first wall penetrating extent and the second wall penetrating extent each have a length, a first curved surface portion facing toward the pivot end and a second curved surface portion facing away from the pivot end, wherein a dimension between the first curved surface portion and the second curved surface portion is constant along a majority of the length;
wherein the retainer end includes a tab portion that extends in a forward direction;
wherein a mount structure is spaced from the tab portion and extends in the forward direction;
wherein the tab portion and the mount structure are formed by respective bent portions of the plate material.

2. An anchor assembly comprising the anchor component of claim 1 as a first anchor component, wherein the anchor assembly further comprises a second anchor component pivotably connected to the first anchor component.

3. The anchor assembly of claim 2, wherein the second anchor component includes a second base and a third wall penetrating retainer having a third wall penetrating extent, wherein the second base and the third wall penetrating retainer are of monolithic configuration formed of a plate material that defines a second plate thickness, wherein the second plate material is bent so as to position the third wall penetrating retainer such that the third wall penetrating extent protrudes in a rearward direction from the second base, with the second plate thickness, along the third wall penetrating extent, running in a direction that extends from a first side toward a second side of the second base, wherein the first and second sides extend in a direction that runs from a pivot end toward a retainer end of the second base.

* * * * *